US011546736B2

(12) United States Patent
Hasegawa et al.

(10) Patent No.: US 11,546,736 B2
(45) Date of Patent: Jan. 3, 2023

(54) VEHICLE CONTROL SYSTEM, VEHICLE CONTROL METHOD, AND VEHICLE CONTROL SERVER

(71) Applicant: HONDA MOTOR CO., LTD., Tokyo (JP)

(72) Inventors: Satoshi Hasegawa, Tokyo (JP); Fumiaki Yamaguchi, Tokyo (JP); Yusuke Takahashi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/382,887

(22) Filed: Jul. 22, 2021

(65) Prior Publication Data

US 2022/0030392 A1  Jan. 27, 2022

(30) Foreign Application Priority Data

Jul. 27, 2020  (JP) .............................. JP2020-126712

(51) Int. Cl.
  *H04W 4/029*  (2018.01)
  *H04W 4/40*  (2018.01)
  (Continued)

(52) U.S. Cl.
  CPC .......... *H04W 4/029* (2018.02); *B60R 16/023* (2013.01); *H04W 4/023* (2013.01); *H04W 4/40* (2018.02); *H04W 64/00* (2013.01); *H04W 84/18* (2013.01)

(58) Field of Classification Search
  CPC ....... H04W 4/029; H04W 4/40; H04W 4/023; H04W 64/00; H04W 84/18; H04W 4/80;
  (Continued)

(56) References Cited

U.S. PATENT DOCUMENTS 10,482,699 B1* 11/2019 Lickfelt ............. G07C 9/00309
2015/0028995 A1* 1/2015 Gautama ............ G07C 9/00944
  340/5.72

(Continued)

FOREIGN PATENT DOCUMENTS

JP   H10-266934   10/1998
JP   2014-025279 A  2/2014
  (Continued)

OTHER PUBLICATIONS

Japanese Office Action with English translation dated May 10, 2022, 9 pages.

*Primary Examiner* — Dung Hong
(74) *Attorney, Agent, or Firm* — Rankin, Hill & Clark LLP

(57) ABSTRACT

A vehicle control system includes a vehicle positional information obtaining unit, a user terminal positional information obtaining unit, a relative distance recognizing unit recognizing a relative distance between a vehicle and a user terminal based on vehicle positional information and user terminal positional information, a wide-area wireless communication control unit controlling implementation of the wide-area wireless communication in the vehicle, and a narrow-area wireless communication control unit controlling implementation of the narrow-area wireless communication in the vehicle and, if the relative distance is longer than or equal to a first determination distance set based on a communicable distance of the narrow-area wireless communication, restricting implementation of the narrow-area wireless communication in the vehicle.

12 Claims, 9 Drawing Sheets

(51) Int. Cl.
   *B60R 16/023* (2006.01)
   *H04W 64/00* (2009.01)
   *H04W 84/18* (2009.01)
   *H04W 4/02* (2018.01)
(58) Field of Classification Search
   CPC .............. H04W 12/122; B60R 16/023; B60R 2325/205; B60R 25/245
   See application file for complete search history.

(56) References Cited

U.S. PATENT DOCUMENTS

| | | | | |
|---|---|---|---|---|
| 2015/0161834 | A1* | 6/2015 | Spahl ..................... | H04W 4/80 |
| | | | | 340/5.61 |
| 2018/0037155 | A1* | 2/2018 | Danowski ............ | B60Q 1/2696 |
| 2018/0339676 | A1* | 11/2018 | Lazarini ................. | H04W 4/40 |
| 2021/0204136 | A1* | 7/2021 | Lummer ............... | H04W 12/06 |

FOREIGN PATENT DOCUMENTS

| | | | |
|---|---|---|---|
| JP | 2014-054902 | | 3/2014 |
| JP | 2014-150425 | A | 8/2014 |
| KR | 101821108 | B1 * | 1/2018 |

* cited by examiner

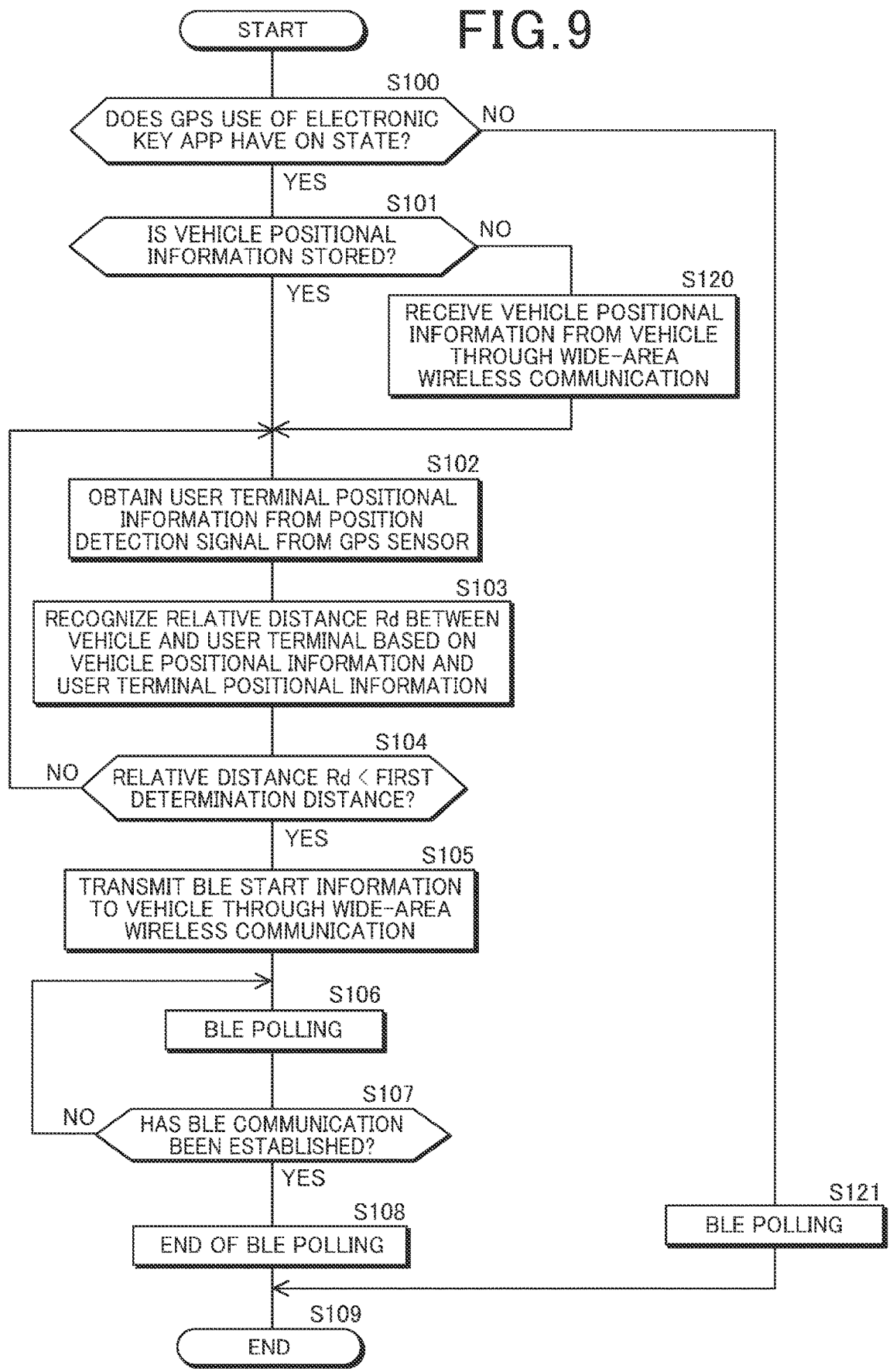

VEHICLE CONTROL SYSTEM, VEHICLE CONTROL METHOD, AND VEHICLE CONTROL SERVER

INCORPORATION BY REFERENCE

The present application claims priority under 35 U.S.C. § 119 to Japanese Patent Application No. 2020-126712 filed on Jul. 27, 2020. The content of the application is incorporated herein by reference in its entirety.

BACKGROUND OF THE INVENTION

Field of the Invention

The present invention relates to a vehicle control system, a vehicle control method, and a vehicle control server.

Description of the Related Art

Conventionally, a vehicle control system has been proposed that includes a security device and an interior reader/writer in a vehicle and thus enables operations on the vehicle by using a vehicle key and a mobile terminal such as a smartphone (see Japanese Patent Laid-Open No. 2014-54902, for example). In the vehicle control system, the security device permits locking/unlocking of a door with the vehicle key if authentication of the vehicle key is succeeded within a communication area outside of the vehicle. The security device further permits to start an engine of the vehicle with the vehicle key if the authentication of the vehicle key is succeeded within a communication area within the vehicle.

Also, the interior reader/writer permits operations on the vehicle (such as locking/unlocking of a door and start of the engine) with a mobile terminal carried onto the vehicle if authentication via near field communication (NFC) with the mobile terminal is succeeded.

A configuration has been proposed which, in a vehicle remote device which receives a wireless signal transmitted from a mobile transmission unit and unlocks a door of a vehicle, intermittently performs power supply to a signal processing unit that receives the wireless signal and changes the period of the power supply in accordance with the presence/absence of door locking and an elapsed time since the door locking is performed so as to reduce power consumption (see Japanese Patent Laid-Open No. 10-266934, for example).

In recent years, more telematics communication units (TCUs) have been installed in vehicles, and a system is starting to widely spread which transmits positional information and maintenance information (such as a tire inflation pressure and a travel distance) on a vehicle to an external server in real time through the TCU. Also, as described above, with some configurations, a user is enabled to remotely operate a vehicle by using a mobile terminal such as a smartphone carried by the user. However, when power consumption by a communication device mounted in a vehicle increases for communication for implementing such functions, there is a risk that a shortage of the remaining amount of a battery for the vehicle occurs. For that, in order to prevent such occurrence of a shortage of the remaining amount of a battery for the vehicle, suppression of power consumption associated with the communication has been demanded.

The present invention has been made in view of such background, and it is an object of the present invention to provide a vehicle control system, a vehicle control method and a vehicle control server by which power consumption by communication in a vehicle can be suppressed.

SUMMARY OF THE INVENTION

As a first aspect for achieving the object, there is provided a vehicle control system that performs control over wireless communication in a vehicle having functionality of wide-area wireless communication through a public line and narrow-area wireless communication that performs narrow-area wireless communication for directly communicating with a mobile terminal, the vehicle control system including a vehicle positional information obtaining unit obtaining vehicle positional information indicating a current position of the vehicle, a user terminal positional information obtaining unit obtaining user terminal positional information indicating a current position of a user terminal, the user terminal having functionality of the wide-area wireless communication and the narrow-area wireless communication and being the mobile terminal to be used by a user of the vehicle, a relative distance recognizing unit recognizing a relative distance between the vehicle and the user terminal based on the vehicle positional information and the user terminal positional information, a wide-area wireless communication control unit controlling implementation of the wide-area wireless communication in the vehicle, and a narrow-area wireless communication control unit controlling implementation of the narrow-area wireless communication in the vehicle and, if the relative distance is longer than or equal to a first determination distance set based on a communicable distance of the narrow-area wireless communication, restricting implementation of the narrow-area wireless communication in the vehicle.

In the vehicle control system, the vehicle positional information obtaining unit, the user terminal positional information obtaining unit, the relative distance recognizing unit and the narrow-area wireless communication control unit may be provided in the user terminal, the vehicle positional information obtaining unit may obtain the vehicle positional information by receiving the vehicle positional information transmitted from the vehicle through the wide-area wireless communication or the narrow-area wireless communication, the user terminal positional information obtaining unit may obtain the user terminal positional information based on a terminal position detection signal by a terminal position sensor provided in the user terminal, and the narrow-area wireless communication control unit may restrict implementation of the narrow-area wireless communication in the vehicle by transmitting, to the vehicle through the wide-area wireless communication, narrow-area wireless communication restriction information that instructs to restrict the narrow-area wireless communication.

In the vehicle control system, the vehicle positional information obtaining unit may store the vehicle positional information in a terminal memory provided in the user terminal, and the relative distance recognizing unit may recognize the relative distance based on the vehicle positional information stored in the terminal memory.

In the vehicle control system, the vehicle positional information obtaining unit, the user terminal positional information obtaining unit, the relative distance recognizing unit and the narrow-area wireless communication control unit may be provided in the vehicle, the vehicle positional information obtaining unit may obtain the vehicle positional information based on a vehicle position detection signal by a vehicle position sensor provided in the vehicle, and the user terminal positional information obtaining unit may obtain the user terminal positional information by receiving the user terminal positional information transmitted from the user terminal through the wide-area wireless communication.

In the vehicle control system, the wide-area wireless communication control unit may restrict implementation of the wide-area wireless communication in the vehicle when the relative distance has increased.

In the vehicle control system, the wide-area wireless communication control unit may restrict implementation of the wide-area wireless communication in the vehicle when the narrow-area wireless communication has been established between the vehicle and the user terminal.

In the vehicle control system, the wide-area wireless communication control unit may restrict implementation of the wide-area wireless communication in the vehicle if the relative distance is equal to or shorter than a second determination distance set based on the communicable distance of the narrow-area wireless communication.

In the vehicle control system, under conditions that the narrow-area wireless communication has been established between the vehicle and the user terminal and implementation of the wide-area wireless communication in the vehicle is under restriction, when the vehicle receives wide-area wireless communication start information that instructs to start the wide-area wireless communication from the user terminal through the narrow-area wireless communication, the wide-area wireless communication control unit may cancel the restriction of implementation of the wide-area wireless communication in the vehicle.

The vehicle control system may further include a power supply state recognizing unit recognizing a state of a power supply for the vehicle. Under a condition that implementation of the wide-area wireless communication in the vehicle is under restriction, when the power supply state recognizing unit recognizes that the power supply has been shifted from an OFF state to an ON state, the wide-area wireless communication control unit may cancel the restriction of implementation of the wide-area wireless communication in the vehicle.

As a second aspect for achieving the object, there is provided a vehicle control method to be executed by a computer for controlling wireless communication in a vehicle having functionality of wide-area wireless communication through a public line and narrow-area wireless communication that performs narrow-area wireless communication for directly communicating with a mobile terminal, the vehicle control method including a vehicle positional information obtaining step of obtaining vehicle positional information indicating a current position of the vehicle, a user terminal positional information obtaining step of obtaining user terminal positional information indicating a current position of a user terminal, the user terminal having functionality of the wide-area wireless communication and the narrow-area wireless communication and being the mobile terminal to be used by a user of the vehicle, a relative distance recognizing step of recognizing a relative distance between the vehicle and the user terminal based on the vehicle positional information and the user terminal positional information, and a narrow-area wireless communication control step of controlling implementation of the narrow-area wireless communication in the vehicle and, if the relative distance is longer than or equal to a determination distance set based on a communicable distance of the narrow-area wireless communication, restricting implementation of the narrow-area wireless communication in the vehicle.

As a third aspect for achieving the object, there is provided a vehicle control method to be executed by a terminal processor included in a user terminal for controlling wireless communication in a vehicle having functionality of wide-area wireless communication through a public line and narrow-area wireless communication that performs narrow-area wireless communication for directly communicating with a mobile terminal, the user terminal being the mobile terminal to be used by a user of the vehicle, the vehicle control method including a vehicle positional information obtaining step of obtaining vehicle positional information indicating a current position of the vehicle by receiving the vehicle positional information from the vehicle through the wide-area wireless communication or the narrow-area wireless communication, a user terminal positional information obtaining step of obtaining user terminal positional information indicating a current position of the user terminal based on a terminal position detection signal by a terminal position sensor provided in the user terminal, a relative distance recognizing step of recognizing a relative distance between the vehicle and the user terminal based on the vehicle positional information and the user terminal positional information, and a narrow-area wireless communication control step of controlling implementation of the narrow-area wireless communication in the vehicle, and, if the relative distance is longer than or equal to a determination distance set based on a communicable distance of the narrow-area wireless communication, restricting implementation of the narrow-area wireless communication in the vehicle by transmitting narrow-area wireless communication restriction information that instructs to restrict the narrow-area wireless communication to the vehicle.

As a fourth aspect for achieving the object, there is provided a vehicle control server that performs wide-area wireless communication between a vehicle having communication functionality by the wide-area wireless communication through a public communication and narrow-area wireless communication that performs narrow-area wireless communication for directly communicating with a mobile terminal and a user terminal having communication functionality by the wide-area wireless communication and the narrow-area wireless communication, the user terminal being the mobile terminal to be used by a user of the vehicle, the vehicle control server including a vehicle positional information obtaining unit obtaining vehicle positional information indicating a current position of the vehicle from the vehicle through the wide-area wireless communication, a user terminal positional information obtaining unit obtaining user terminal positional information indicating a current position of the user terminal from the user terminal through the wide-area wireless communication, a relative distance recognizing unit recognizing a relative distance between the vehicle and the user terminal based on the vehicle positional information and the user terminal positional information, and a narrow-area wireless communication control unit controlling implementation of the narrow-area wireless communication in the vehicle and, if the relative distance is longer than or equal to a determination distance set based on a communicable distance of the narrow-area wireless communication, transmitting narrow-area wireless communication restriction information that instructs to restrict implementation of the narrow-area wireless communication in the vehicle to the vehicle through the wide-area wireless communication.

The vehicle control server may further include a vehicle remote operating unit, when narrow-area wireless communication establishment information indicating that the narrow-area wireless communication has been established between the vehicle and the user terminal is received from the vehicle through the wide-area wireless communication, performing a subsequent remote operation on the vehicle by transmitting remote operation instruction information including instruction details of the remote operation and an instruction to transmit the instruction details to the vehicle to the user terminal through the wide-area wireless communication.

The vehicle control server may further include a wide-area wireless communication control unit controlling implementation of the wide-area wireless communication in the vehicle and, when power supply ON information indicating that a power supply for the vehicle has been shifted from an OFF state to an ON state is received from the user terminal through the wide-area wireless communication, transmitting, to the user terminal through the wide-area wireless communication, narrow-area wireless communication restriction cancellation information including an instruction to cancel restriction of implementation of the wide-area wireless communication and an instruction to transmit the cancellation instruction to the vehicle.

As a fifth aspect for achieving the object, there is provided a vehicle control method to be executed by a vehicle control server that performs wide-area wireless communication between a vehicle having communication functionality by the wide-area wireless communication through a public communication and narrow-area wireless communication that performs narrow-area wireless communication for directly communicating with a mobile terminal and a user terminal having communication functionality by the wide-area wireless communication and the narrow-area wireless communication, the user terminal being the mobile terminal to be used by a user of the vehicle, the vehicle control method including a vehicle positional information obtaining step of obtaining vehicle positional information indicating a current position of the vehicle from the vehicle through the wide-area wireless communication, a user terminal positional information obtaining step of obtaining user terminal positional information indicating a current position of the user terminal from the user terminal through the wide-area wireless communication, a relative distance recognizing step of recognizing a relative distance between the vehicle and the user terminal based on the vehicle positional information and the user terminal positional information, and a narrow-area wireless communication control step of controlling implementation of the narrow-area wireless communication in the vehicle and, if the relative distance is longer than or equal to a determination distance set based on a communicable distance of the narrow-area wireless communication, transmitting narrow-area wireless communication restriction information that instructs to restrict implementation of the narrow-area wireless communication in the vehicle to the vehicle through the wide-area wireless communication.

Advantageous Effect of Invention

According to the aforementioned vehicle control system, if a relative distance between a vehicle and a user terminal is longer than or equal to a first determination distance set based on a communicable distance of narrow-area wireless communication, implementation of narrow-area wireless communication in the vehicle is restricted. Thus, unnecessary power consumption by continuation of normal processing for performing the narrow-area wireless communication in the vehicle under a condition that the narrow-area wireless communication between the vehicle and the user terminal is disabled can be avoided, and the power consumption by the communication in the vehicle can be suppressed.

BRIEF DESCRIPTION OF THE DRAWINGS

FIG. 9 is a flowchart of processing in the user terminal for cancelling restriction of implementation of narrow-area wireless communication in a vehicle.

DETAILED DESCRIPTION OF THE PREFERRED EMBODIMENTS

1. Aspect of Wide-Area Wireless Communication and Narrow-Area Wireless Communication Referring to FIG. 1, a vehicle 1 in which a vehicle control system 10 according to an embodiment is mounted and user terminals 100, 110 that are mobile terminals to be used by users U, V of the vehicle 1 have functionality of wide-area wireless communication and narrow-area wireless communication. The vehicle control system 10 includes an electronic control unit (ECU) having a processor, a memory and so on, the details of which are described below.

The user terminals 100, 110 are, for example, a smartphone, a cellular phone, a tablet terminal or a wearable device such as a smart watch and are carried or worn by the users U, V for use. The user terminals 100, 110 correspond to a mobile terminal of the present invention. An electronic key application program (app) for remotely operating the vehicle 1 is installed in the user terminals 100, 110, and the user terminals 100, 110 function as electronic keys including a remote operation function for the vehicle 1 by executing the electronic key app.

Figure 1:
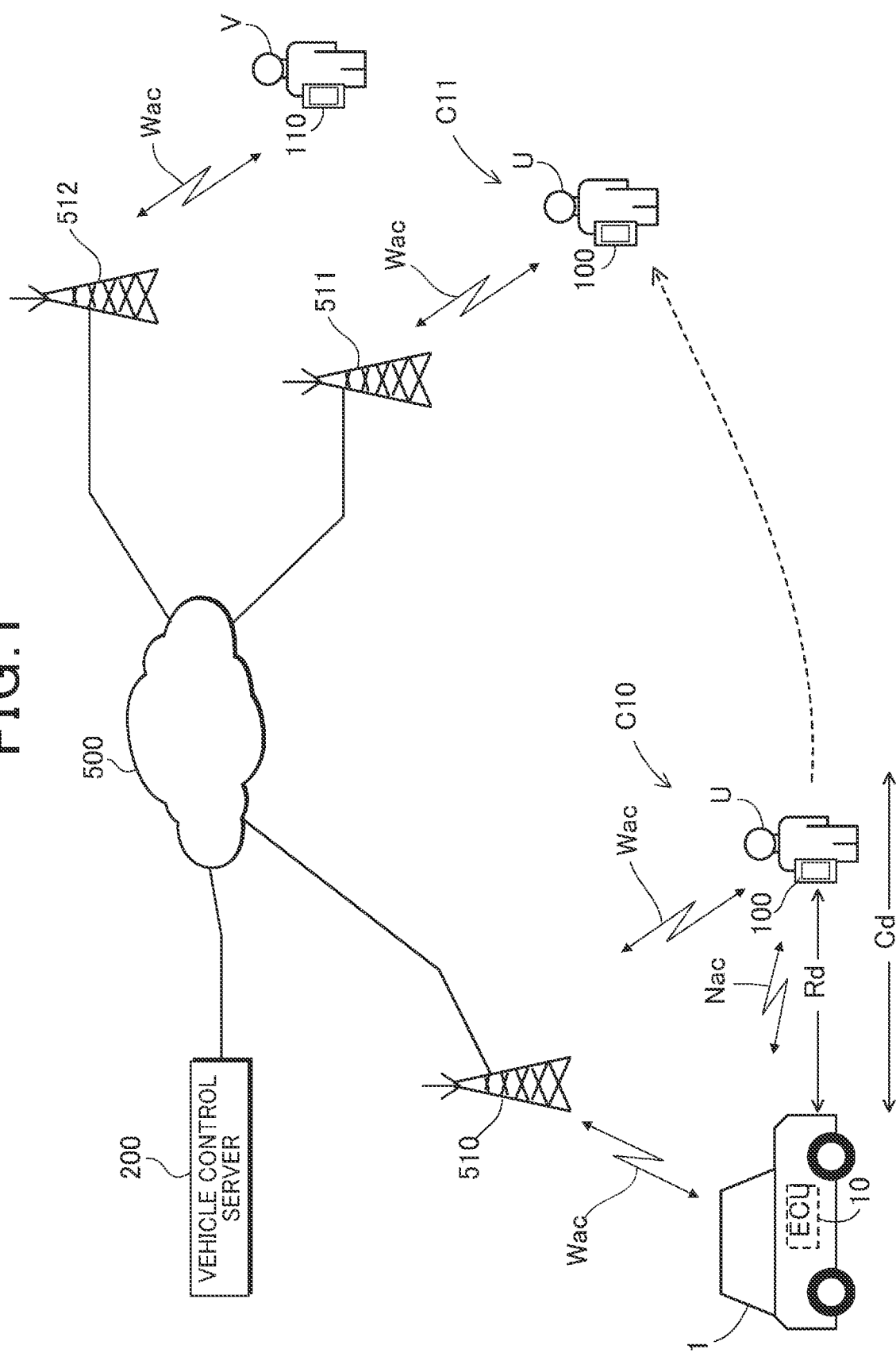
FIG. 1 is an explanatory diagram of an aspect of wide-area wireless communication and narrow-area wireless communication to be performed between a vehicle and a user terminal.

FIG. 1 shows a wide-area wireless communication Wac that is implemented through a public line 500 and narrow-area wireless communication Nac in which direct communication is performed between the vehicle 1 and the user terminal 100. According to this embodiment, the narrow-area wireless communication Nac is a Bluetooth Low Energy (BLE where Bluetooth is a registered trademark). The vehicle 1 performs wide-area wireless communication with the user terminals 100, 110 via base stations 510, 511, 512 of the public line 500. While the user terminal 100 is described below, the same is true for the user terminal 110.

As indicated by Reference C10, if a relative distance Rd between the vehicle 1 and the user terminal 100 is equal to or shorter than a communicable distance Cd of the narrow-area wireless communication Nac, the narrow-area wireless communication Nac between the vehicle 1 and the user terminal 100 is enabled. If the relative distance Rd between the vehicle 1 and the user terminal 100 is longer than the communicable distance Cd, the narrow-area wireless communication Nac between the vehicle 1 and the user terminal 100 is disabled.

The vehicle control system 10 performs Ultra Wide Band (UWB) communication between the vehicle 1 and the user terminal 100, measures a position of the user terminal 100 with respect to the vehicle 1 and recognizes whether the user terminal 100 is located within the interior of the vehicle 1 or not. In the UWB communication, a band of 500 MHz to ten odd GHz (such as around an 8 GHz band) is used.

Regarding wide-area wireless communication Wac, if the vehicle 1 and the user terminal 100 are located closely to one of the base stations 510, 511 and 512, the wide-area wireless communication Wac between the vehicle 1 and the user terminal 100 via the public line 500 is enabled irrespective of the relative distance between the vehicle 1 and the user terminal 100.

The vehicle 1 performs communication with a vehicle control server 200 through the wide-area wireless communication Wac and transmits positional information on the vehicle 1 and maintenance information (such as a tire inflation pressure and a travel distance) on the vehicle 1 to the vehicle control server 200. The vehicle control server 200 stores these kinds of information received from the vehicle 1 for management of the vehicle 1.

If the user U is away from the vehicle 1 by a distance longer than the communicable distance Cd, as indicated by Reference C11, activation of an air-conditioner in the vehicle 1, for example, can be remotely instructed by transmitting remote operation instruction information from the user terminal 100 to the vehicle 1 through the wide-area wireless communication Wac.

In order to suppress power consumption by implementation of the narrow-area wireless communication Nac and wide-area wireless communication Wac in the vehicle 1, the vehicle control system 10 of this embodiment executes processing that restricts implementation of the narrow-area wireless communication Nac and wide-area wireless communication Wac.

2. Measurement of Position of User Terminal by UWB

Figure 2:
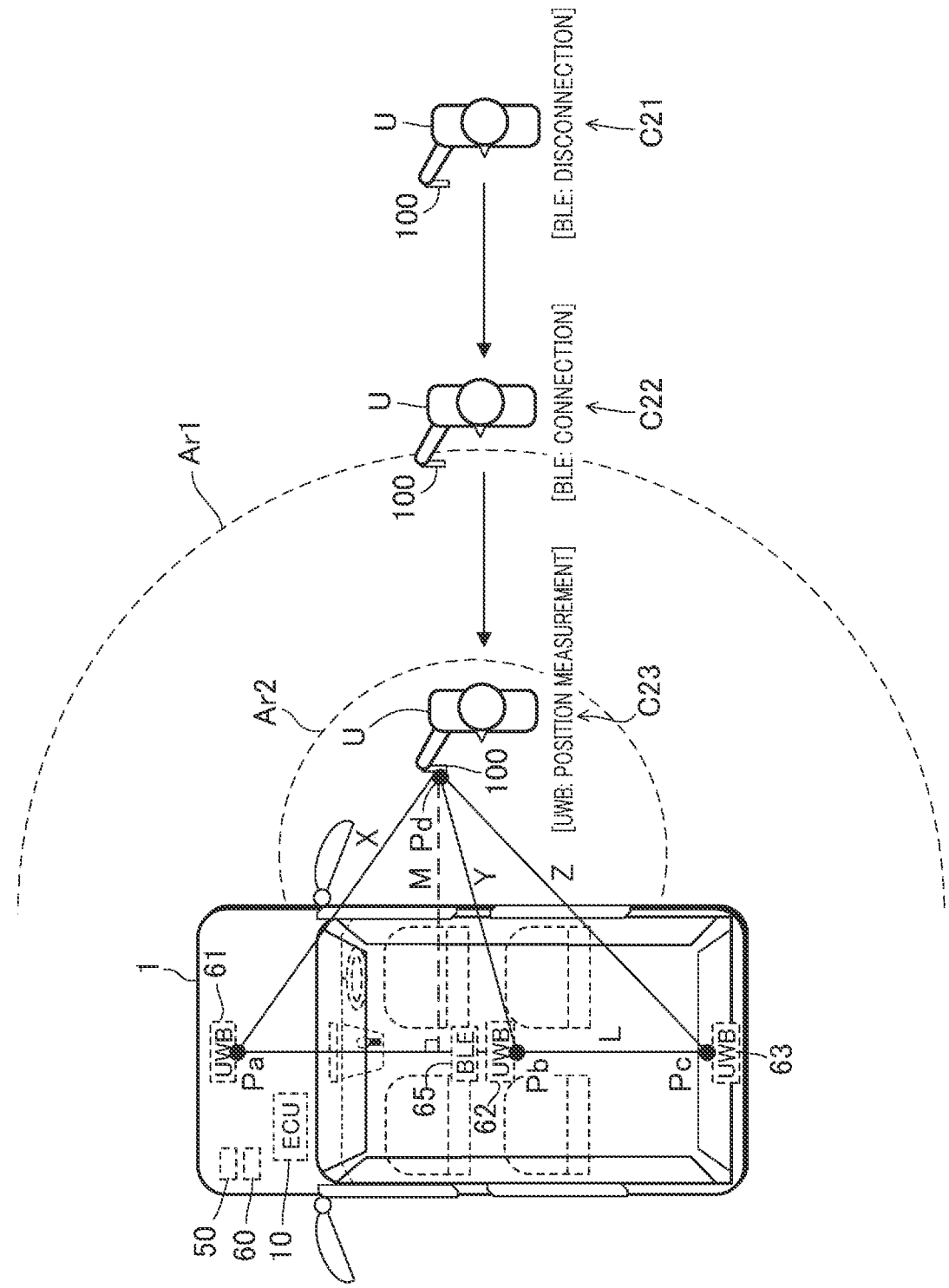
FIG. 2 is an explanatory diagram of an aspect in which a position of a user terminal with respect to a vehicle is measured by a vehicle control system.

With reference to FIG. 2, processing in which the vehicle control system 10 recognizes a position of the user terminal 100 with respect to the vehicle 1 by UWB is described. The vehicle 1 includes a narrow-area wireless communication device 60 that performs narrow-area wireless communication through BLE and UWB and a wide-area wireless communication device 50 that performs wide-area wireless communication through a public line. The wide-area wireless communication device 50 is, for example, a telematics communication unit (TCU).

The vehicle 1 includes a BLE antenna 65 and UWB antennas 61, 62, 63 connected to the narrow-area wireless communication device 60. The BLE antenna 65 is arranged substantially in a center part of the vehicle 1. The UWB antenna 61 is arranged in a front part of the vehicle 1, the UWB antenna 62 is arranged in the center part of the vehicle 1, and the UWB antenna 63 is arranged in a rear part of the vehicle 1.

The vehicle control system 10 performs polling through BLE communication by controlling the narrow-area wireless communication device 60, and, when the user terminal 100 enters from outside (the state indicated by Reference C21) to inside (the state indicated by Reference C22) of an out-vehicle communication area Ar1 of BLE communication by the narrow-area wireless communication device 60, establishes wireless communication by BLE with the user terminal 100 within the out-vehicle communication area Ar1.

The vehicle control system 10 then confirms that the user terminal 100 has been registered as an electronic key of the vehicle 1 by performing authentication of the electronic key on the user terminal 100. More specifically, the vehicle control system 10 confirms that the user terminal 100 has been registered as an electronic key of the vehicle 1 by comparing an authentication code transmitted from the user terminal 100 and an authentication code saved in the memory of the vehicle control system 10.

The vehicle control system 10 measures a vehicle-terminal distance M in order to permit use of the user terminal 100 as an electronic key. The vehicle control system 10 performs UWB communication through the narrow-area wireless communication device 60 with the user terminal 100 and measures a distance X between the UWB antenna 61 and the user terminal 100, a distance Y between the UWB antenna 62 and the user terminal 100, and a distance Z between the UWB antenna 63 and the user terminal 100 based on Time of Flight (ToF). Because a position Pa of the UWB antenna 61, a position Pb of the UWB antenna 62 and a position Pc of the UWB antenna 63 in the vehicle 1 are known, a relative position Pd of the user terminal 100 with respect to the vehicle 1 is calculated by trilateration by measuring X, Y and Z, and the vehicle-terminal distance M can thus be measured.

When communication by BLE is established between the narrow-area wireless communication device 60 and the user terminal 100, the vehicle control system 10 performs distance measurement repeat processing that repeats measurement of the vehicle-terminal distance M through UWB communication. When the vehicle control system 10 recognizes that the user terminal 100 has entered a monitoring area Ar2 near the vehicle 1 (the state indicated by Reference C23), the vehicle control system 10 permits use of the user terminal 100 as the electronic key.

Thus, the user U can unlock and lock a door of the vehicle 1, open and close an electric door (such as a power slide door, a power hinge door or a power tail gate), start the engine, turn on/off an air conditioner, and cause a buzzer to go off, for example, by operating the user terminal 100. When the vehicle control system 10 recognizes that the user terminal 100 has entered the monitoring area Ar2, the vehicle control system 10 performs processing for, for example, putting on a welcome light (not shown) included in the vehicle 1.

3. Configurations of Vehicle and Vehicle Control System

Figure 3:
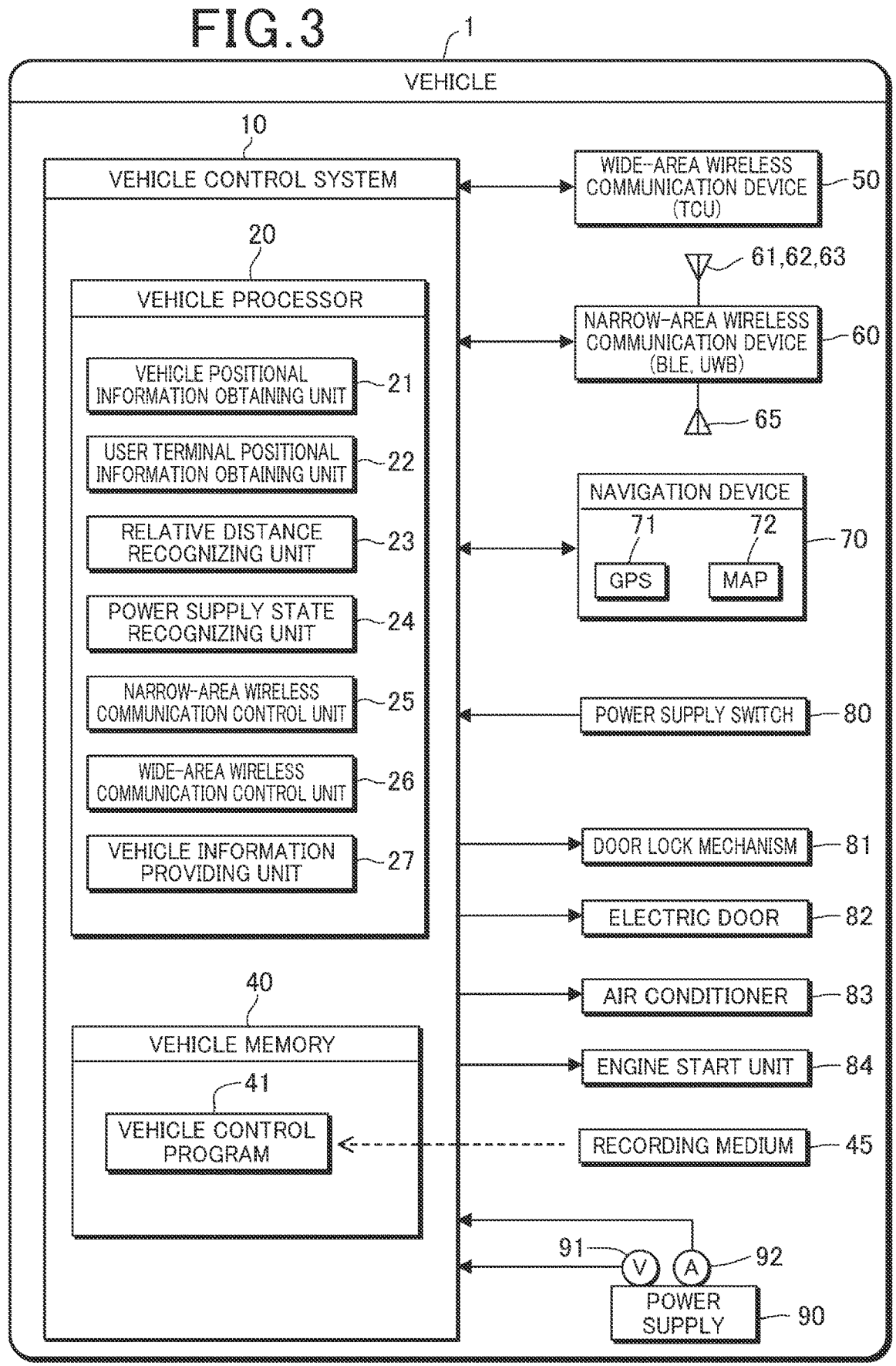
FIG. 3 is a configuration diagram of a vehicle in which the vehicle control system is mounted.

With reference to FIG. 3, configurations of the vehicle 1 and the vehicle control system 10 mounted in the vehicle 1 are described. The vehicle 1 includes a navigation device 70, a power supply switch 80, a door lock mechanism 81, an electric door 82 (such as a power slide door, a power hinge door or a power tail gate), an air conditioner 83, an engine start unit 84, and a power supply 90 in addition to the aforementioned vehicle control system 10, the wide-area wireless communication device 50 and narrow-area wireless communication device 60.

The navigation device 70 includes a global positioning system (GPS) sensor 71 that detects a current position (latitude and longitude) of the vehicle 1 and map data 72 and performs, for example, route guidance to a destination. The power supply 90 supplies source power to the vehicle control system 10, the wide-area wireless communication device 50, the narrow-area wireless communication device 60 and so on. The power supply 90 includes a voltage sensor 91 that detects voltage of the power supply 90, and a current sensor 92 that detects input/output current to/from the power supply 90.

The vehicle control system 10 is an ECU including a vehicle processor 20, a vehicle memory 40, an interface circuit, not shown, and so on. The vehicle processor 20 includes one or more processors. The vehicle processor 20 functions as a vehicle positional information obtaining unit 21, a user terminal positional information obtaining unit 22, a relative distance recognizing unit 23, a power supply state recognizing unit 24, a narrow-area wireless communication control unit 25, a wide-area wireless communication control unit 26, and a vehicle information providing unit 27 by reading and executing a vehicle control program 41 stored in the vehicle memory 40. The vehicle processor 20 corresponds to a computer of the present invention.

The vehicle control program 41 may be read from a recording medium 45 (such as an optical disk or a flash memory) recording the vehicle control program to the vehicle control system 10 or may be downloaded from an external system such as the vehicle control server 200 to the vehicle control system 10.

Processing to be performed by the vehicle positional information obtaining unit 21 corresponds to a vehicle positional information obtaining step in a vehicle control method of the present invention, and processing to be performed by the user terminal positional information obtaining unit 22 corresponds to a user terminal positional information obtaining step in the vehicle control method of the present invention. Processing to be performed by the relative distance recognizing unit 23 corresponds to a relative distance recognizing step in the vehicle control method of the present invention, and processing to be performed by the narrow-area wireless communication control unit 25 corresponds to a narrow-area wireless communication control step in the vehicle control method of the present invention. Processing to be performed by the wide-area wireless communication control unit 26 corresponds to a wide-area wireless communication control step in the vehicle control method of the present invention.

The vehicle positional information obtaining unit 21 obtains, from the navigation device 70, vehicle positional information indicating a current position of the vehicle 1 detected by the GPS sensor 71 in the navigation device 70. The user terminal positional information obtaining unit 22 obtains, from the user terminal 100 through wide-area wireless communication by the wide-area wireless communication device 50, user terminal positional information indicating a current position of the user terminal 100 detected by a GPS sensor (not shown) included in the user terminal 100.

The relative distance recognizing unit 23 calculates a relative distance Rd (see FIG. 1) between the vehicle 1 and the user terminal 100 from the current position of the vehicle 1 recognized from the vehicle positional information obtained by the vehicle positional information obtaining unit 21 and the current position of the user terminal 100 recognized from the user terminal positional information obtained by the user terminal positional information obtaining unit 22.

The power supply state recognizing unit 24 recognizes a state of the power supply 90 based on an operation signal of the power supply switch 80, a voltage detection signal of the voltage sensor 91, a current detection signal of the current sensor 92 and so on. The narrow-area wireless communication control unit 25 controls implementation of narrow-area wireless communication by BLE and UWB with the user terminal 100 through the narrow-area wireless communication device 60. The wide-area wireless communication control unit 26 controls implementation of wide-area wireless communication with the user terminal 100 and the vehicle control server 200 through the wide-area wireless communication device 50.

The vehicle information providing unit 27 transmits positional information and maintenance information (such as a tire inflation pressure and a travel distance) on the vehicle 1 to the vehicle control server 200 through wide-area wireless communication as requested. The vehicle control server 200 stores these kinds of information transmitted from the vehicle 1 and utilizes them for management of the vehicle 1.

Figure 4:
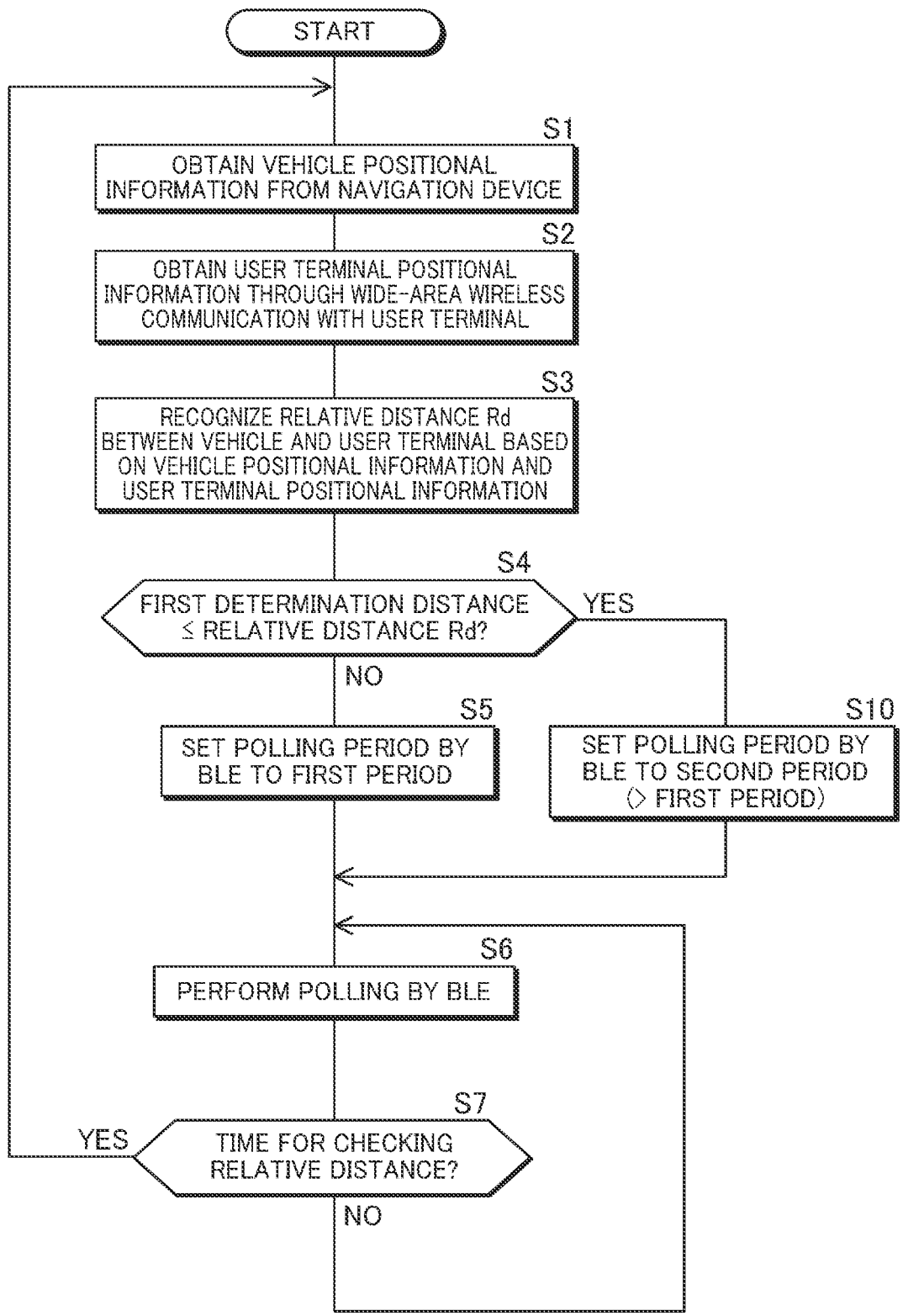
FIG. 4 is a flowchart of processing for restriction and cancellation of the restriction of implementation of narrow-area wireless communication in a vehicle.

4. Processing of Restriction and Cancellation of Restriction of Narrow-Area Wireless Communication By following the flowchart shown in FIG. 4, processing of restriction and cancellation of the restriction of implementation of narrow-area wireless communication in the vehicle 1, which is executed by the vehicle control system 10, is described. In step S1 in FIG. 4, the vehicle positional information obtaining unit 21 obtains vehicle positional information from the navigation device 70. In the subsequent step S2, the user terminal positional information obtaining unit 22 obtains user terminal positional information through wide-area wireless communication with the user terminal 100. In the subsequent step S3, the relative distance recognizing unit 23 calculates a relative distance Rd (see FIG. 1) between the vehicle 1 and the user terminal 100 based on the vehicle positional information and the user terminal positional information.

The next steps S4 to S7 and S10 correspond to processing to be performed by the narrow-area wireless communication control unit 25. In step S4, the narrow-area wireless communication control unit 25 determines whether the relative distance Rd between the vehicle 1 and the user terminal 100 is longer than or equal to a first determination distance or not. Based on the communicable distance Cd (see FIG. 1) by BLE, the first determination distance is set to, for example, a distance slightly shorter than the communicable distance Cd. The first determination distance also corresponds to a determination distance of the present invention.

If the relative distance Rd between the vehicle 1 and the user terminal 100 is longer than or equal to the first determination distance, the narrow-area wireless communication control unit 25 moves the processing to step S10, and if the relative distance Rd between the vehicle 1 and the user terminal 100 is shorter than the first determination distance, moves the processing to step S5. In step S5, the narrow-area wireless communication control unit 25 sets the polling period by BLE to a first period that is a normal period.

On the other hand, in step S10, the narrow-area wireless communication control unit 25 sets the polling period by BLE to a second period that is longer than the first period. Thus, if the relative distance Rd between the vehicle 1 and the user terminal 100 is longer than or equal to the first determination distance, the frequency for executing the polling by BLE in the vehicle 1 is reduced, and implementation of the BLE communication in the vehicle 1 is restricted.

In this way, by restricting implementation of BLE communication, power to be consumed for the communication in the vehicle 1 can be reduced. It should be noted that, as the restriction of implementation of BLE communication, processing for stopping the polling may be performed in addition of processing for increasing the polling period. In accordance with the relative distance Rd between the vehicle 1 and the user terminal 100, for example, as the relative distance Rd increases, the polling period to be set may be increased.

The narrow-area wireless communication control unit 25 in the subsequent step S6 performs the polling by BLE. The narrow-area wireless communication control unit 25 in the next step S7 determines whether the time for checking the relative distance has been reached or not. The time for checking the relative distance is set, for example, after every lapse of a predetermined period. The narrow-area wireless communication control unit 25 moves from step S7 to step S6 and repeatedly executes the polling by BLE until the time for checking the relative distance.

When the time for checking the relative distance is reached, the narrow-area wireless communication control unit 25 moves the processing to step S1 where the polling period by BLE is updated in accordance with the relative distance Rd between the vehicle 1 and the user terminal 100. If the relative distance Rd between the vehicle 1 and the user terminal 100 changes from a state that the relative distance Rd is longer than or equal to the first determination distance to a state that the relative distance Rd is shorter than the first determination distance, the polling period by BLE is set to the first period in step S5, and the restriction of the BLE communication is cancelled.

5. Processing of Restriction and Cancellation of Restriction of Wide-Area Wireless Communication By following the flowchart shown in FIG. 5, processing of restriction and cancellation of the restriction of implementation of wide-area wireless communication in the vehicle 1, which is executed by the vehicle control system 10, is described. The vehicle control system 10 repeatedly executes processing based on the flowchart shown in FIG. 5. In step S30 in FIG. 5, the wide-area wireless communication control unit 26 determines whether the relative distance Rd between the vehicle 1 and the user terminal 100, which is recognized by the relative distance recognizing unit 23, has increased or not. If the relative distance Rd between the vehicle 1 and the user terminal 100 has increased, the wide-area wireless communication control unit 26 moves the processing to step S50, and if the relative distance between the vehicle 1 and the user terminal 100 has not increased, moves the processing to step S31.

In step S50, the wide-area wireless communication control unit 26 performs processing for reducing the communication frequency of the wide-area wireless communication as the processing for restricting implementation of the wide-area wireless communication. Thus, when the user U carrying the user terminal 100 moves away from the vehicle 1 and the possibility that the user U uses the vehicle 1 decreases, power consumption by the wide-area wireless communication to be performed between the vehicle 1 and the vehicle control server 200 and between the vehicle 1 and the user terminal 100 can be reduced.

In step S31, the wide-area wireless communication control unit 26 determines whether BLE communication has been established between the vehicle 1 and the user terminal 100 or not. If BLE communication has been established between the vehicle 1 and the user terminal 100, the wide-area wireless communication control unit 26 moves the processing to step S51, and if BLE communication has not been established between the vehicle 1 and the user terminal 100, moves the processing to step S32.

In step S51, the wide-area wireless communication control unit 26 performs processing for inhibiting implementation of the wide-area wireless communication by the wide-area wireless communication device 50 as processing for restricting implementation of the wide-area wireless communication. Thus, when communication between the vehicle 1 and the user terminal 100 is enabled through the BLE communication and when communication between the vehicle 1 and the vehicle control server 200 via the user terminal 100 is enabled without using the wide-area wireless communication, power consumption by implementation of wide-area wireless communication can be avoided.

For example, referring to FIG. 1, when the relative distance Rd between the user terminal 100 and the vehicle 1 is equal to or shorter than the communicable distance Cd of the narrow-area wireless communication Nac (BLE communication) as indicated by Reference C10 and when BLE communication has been established between the vehicle 1 and the user terminal 100, the vehicle 1 can communicate with the vehicle control server 200 through the user terminal 100 by BLE communication, without using the wide-area wireless communication Wac. The vehicle 1 can also communicate with the user terminal 110 through the user terminal 100 by BLE communication, without using the wide-area wireless communication Wac.

In step S32, the wide-area wireless communication control unit 26 determines whether the relative distance Rd between the vehicle 1 and the user terminal 100, which is recognized by the relative distance recognizing unit 23, is equal to or shorter than a second determination distance or not. Based on the communicable distance Cd (see FIG. 1) by BLE, the second determination distance is set to, for example, a distance slightly shorter than the communicable distance Cd. If the relative distance between the vehicle 1 and the user terminal 100 is equal to or shorter than the second determination distance, the wide-area wireless communication control unit 26 moves the processing to step S51, and if the relative distance between the vehicle 1 and the user terminal 100 is longer than the second determination distance, moves the processing to step S33.

In step S51, the wide-area wireless communication control unit 26 performs the processing for inhibiting implementation of wide-area wireless communication by the wide-area wireless communication device 50, as described above. Thus, when the user terminal 100 is at a position where the BLE communication with the vehicle 1 is enabled, power consumption by implementation of the wide-area wireless communication can be avoided.

In step S33, the wide-area wireless communication control unit 26 in step S50 or S51 determines whether the implementation of the wide-area wireless communication is already under restriction or not. If the implementation of the wide-area wireless communication is under restriction, the wide-area wireless communication control unit 26 moves the processing to step S34, and if the implementation of the wide-area wireless communication is not under restriction, moves the processing to step S30.

In step S34, the wide-area wireless communication control unit 26 determines whether wide-area wireless communication start information that instructs to start wide-area wireless communication has been received from the user terminal through the BLE communication or not. Then, if the wide-area wireless communication start information has been received, the wide-area wireless communication control unit 26 moves the processing to step S35, and if the wide-area wireless communication start information has not been received, moves the processing to step S52. The wide-area wireless communication start information is transmitted directly from the user terminal 100 or from the vehicle control server 200 through the user terminal 100 to the vehicle 1.

In step S52, the wide-area wireless communication control unit 26 determines whether the power supply state recognizing unit 24 has recognized that the power supply 90 has been shifted from an OFF state to an ON state or not. If the power supply 90 has been shifted from the OFF state to the ON state, the wide-area wireless communication control unit 26 moves the processing to step S35 and, if the power supply 90 has not been shifted from the OFF state to the ON state, moves the processing to step S30.

In step S35, the wide-area wireless communication control unit 26 cancels the restriction of the implementation of the wide-area wireless communication by the wide-area wireless communication device 50. Thus, if the wide-area wireless communication start information has been received from the user terminal 100 by BLE in step S34 and if the power supply 90 has been shifted from the OFF state to the ON state in step S52, the restriction of the implementation of the wide-area wireless communication by the wide-area wireless communication device 50 is cancelled.

6. Other Embodiments

While the vehicle control system 10 is configured by the ECU provided in the vehicle 1 according to the aforementioned embodiment, a part of the configuration of the vehicle control system 10 may be provided in the vehicle control server 200. For example, the vehicle positional information obtaining unit 21, the user terminal positional information obtaining unit 22 and the relative distance recognizing unit 23 may be provided in the vehicle control server 200, and relative distance information indicating the relative distance Rd between the vehicle 1 and the user terminal 100 recognized by the relative distance recognizing unit 23 may be transmitted from the vehicle control server 200 to the vehicle 1. In this case, a vehicle control system of the present invention includes the vehicle control system 10 provided in the vehicle 1 and the vehicle control server 200.

By providing the same configuration as that of the vehicle control system 10 of the aforementioned embodiment in the vehicle control server 200 and performing wide-area wireless communication between the vehicle control server 200 and the vehicle 1 and the user terminal 100, the restriction of implementation of narrow-area wireless communication and wide-area wireless communication in the vehicle 1 and the cancellation of the restriction may be performed.

Figure 6:
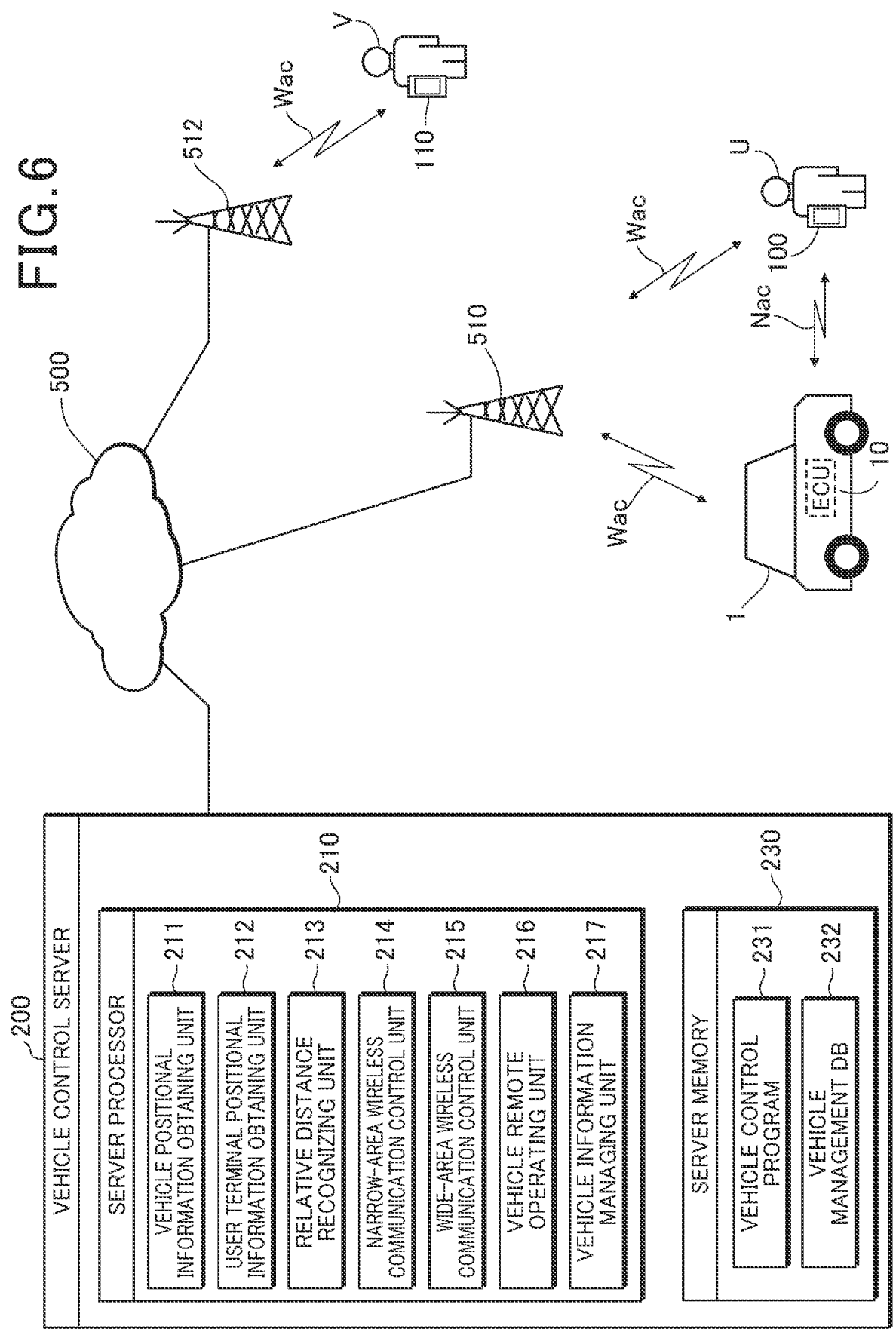
FIG. 6 is a configuration diagram of a vehicle control server.

FIG. 6 shows an example in which a configuration for performing the restriction of implementation of narrow-area wireless communication and wide-area wireless communication and cancellation of the restriction in the vehicle 1 is provided in the vehicle control server 200. Like numbers refer to like parts in FIG. 1 and FIG. 6, and repetitive descriptions are omitted. The vehicle control server 200 includes a server processor 210, a server memory 230, a communication interface circuit, not shown, and so on. The server processor 210 includes one or more processors.

The server memory 230 stores a vehicle control program 231 and a vehicle management database (DB) 232 in which maintenance information and so on transmitted from the vehicle 1 are recorded. By reading and executing the vehicle control program 231 from the server memory 230, the server processor 210 functions as a vehicle positional information obtaining unit 211, a user terminal positional information obtaining unit 212, a relative distance recognizing unit 213, a narrow-area wireless communication control unit 214, a wide-area wireless communication control unit 215, a vehicle remote operating unit 216, and a vehicle information managing unit 217.

The processing to be performed by the vehicle positional information obtaining unit 211 corresponds to a vehicle positional information obtaining step in the vehicle control method of the present invention, and the processing to be performed by the user terminal positional information obtaining unit 212 corresponds to a user terminal positional information obtaining step in the vehicle control method of the present invention. The processing to be performed by the relative distance recognizing unit 213 corresponds to a relative distance recognizing step in the vehicle control method of the present invention, and the processing to be performed by the narrow-area wireless communication control unit 214 corresponds to a narrow-area wireless communication control step in the vehicle control method of the present invention.

The processing to be performed by the vehicle positional information obtaining unit 211, the user terminal positional information obtaining unit 212, and the relative distance recognizing unit 213 is the same as the processing to be performed by the vehicle positional information obtaining unit 21, the user terminal positional information obtaining unit 22, and the relative distance recognizing unit 23, respectively, in the vehicle control system 10. However, the vehicle positional information obtaining unit 211 obtains vehicle positional information by receiving vehicle positional information transmitted from the vehicle 1 through wide-area wireless communication.

The processing to be performed by the narrow-area wireless communication control unit 214 and the wide-area wireless communication control unit 215 is the same as the processing to be performed by the narrow-area wireless communication control unit 25 and the wide-area wireless communication control unit 26, respectively, in the vehicle control system 10. However, the narrow-area wireless communication control unit 214 restricts implementation of narrow-area wireless communication in the vehicle 1 by transmitting, to the vehicle 1, narrow-area wireless communication restriction information that instructs to restrict implementation of narrow-area wireless communication in the vehicle 1 through wide-area wireless communication.

When the wide-area wireless communication control unit 215 receives power supply ON information indicating that the power supply 90 in the vehicle 1 has been shifted from an OFF state to an ON state from the user terminal 100 through wide-area wireless communication, the wide-area wireless communication control unit 215 transmits narrow-area wireless communication restriction cancellation information including an instruction to cancel restriction of implementation of wide-area wireless communication and an instruction to transmit the cancellation instruction to the vehicle 1 to the user terminal 100 through wide-area wireless communication. Thus, the narrow-area wireless communication restriction cancellation information is transmitted from the vehicle control server 200 to the vehicle 1 by BLE communication between the user terminal 100 and the vehicle 1 through the user terminal 100, and the restriction of the wide-area wireless communication in the vehicle 1 is cancelled.

When the vehicle remote operating unit 216 receives narrow-area wireless communication establishment information indicating that BLE communication has been established between the vehicle 1 and the user terminal 100 from the vehicle 1 through wide-area wireless communication, the vehicle remote operating unit 216 performs a subsequent remote operation on the vehicle 1 by transmitting remote operation instruction information including instruction details of the remote operation and a transmission instruction to the vehicle 1 of the instruction details to the user terminal 100 through wide-area wireless communication. Thus, the remote operation on the vehicle 1 by the vehicle control server 200 is performed through the user terminal 100, and, because implementation of wide-area wireless communication between the vehicle control server and the vehicle 1 for the remote operation becomes unnecessary, the implementation of the wide-area wireless communication in the vehicle 1 is suppressed, and the power consumption by the implementation of the wide-area wireless communication in the vehicle 1 is reduced.

Referring to FIG. 6, when the user V transmits information that instructs a remote operation on the vehicle 1 to the vehicle control server 200 by operating the user terminal 110, the information that instructs the remote operation is transmitted as user terminal 110→vehicle control server 200→user terminal 100→vehicle 1 through the public line 500. In this case, the vehicle 1 can recognize the instruction on the remote operation by the user V and execute processing according to the instruction on the remote operation, without implementing wide-area wireless communication.

Figure 5:
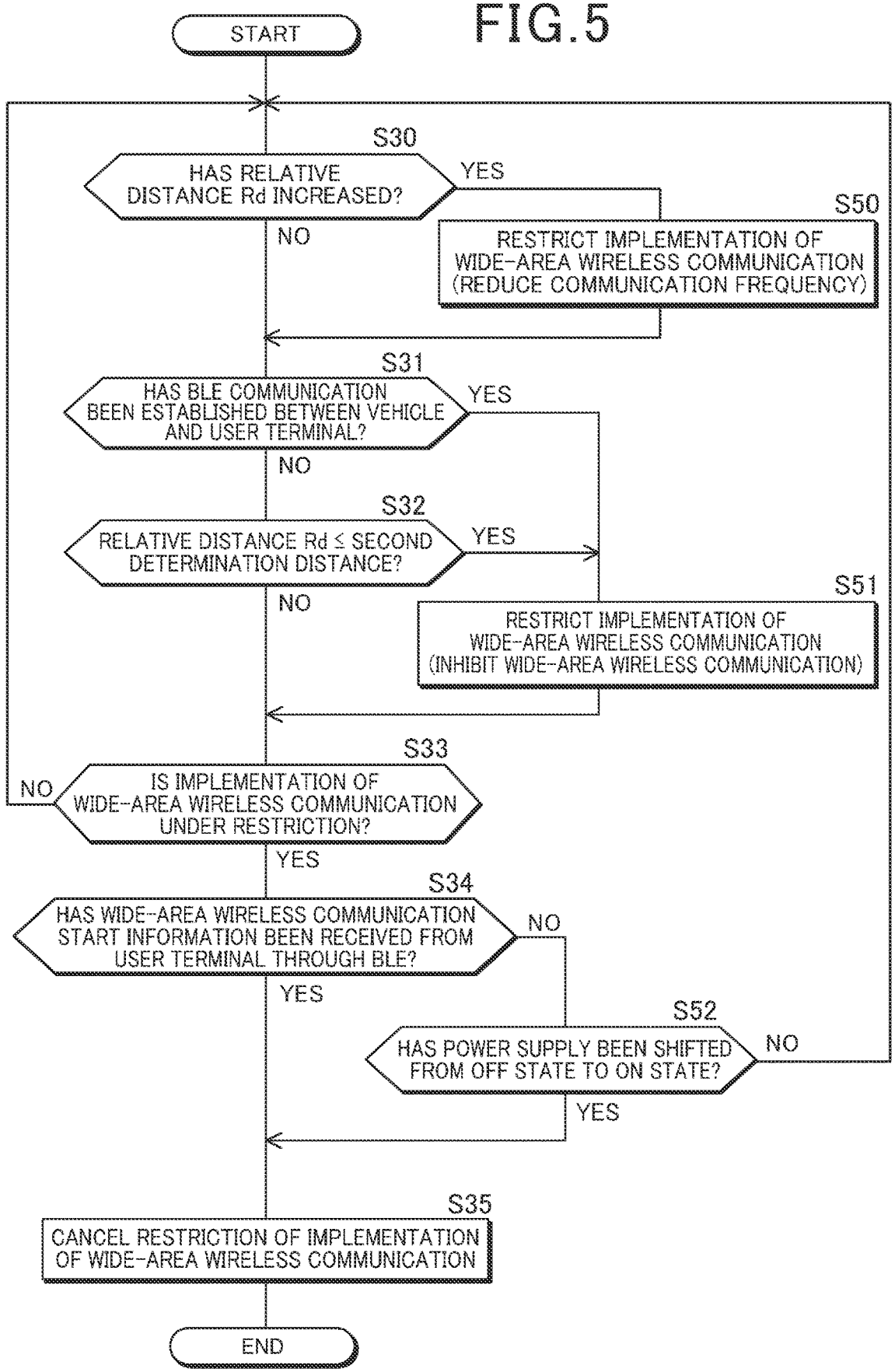
FIG. 5 is a flowchart of processing for restriction and cancellation of the restriction of implementation of wide-area wireless communication in a vehicle.

In the aforementioned embodiment, the wide-area wireless communication control unit 26 included in the vehicle control system 10 restricts implementation of wide-area wireless communication in the vehicle 1 (1) when the relative distance Rd between the vehicle 1 and the user terminal 100 has increased, (2) when BLE communication has been established between the vehicle 1 and the user terminal 100, and (3) if the relative distance Rd between the vehicle 1 and the user terminal 100 is equal to or shorter than the second determination distance by steps S30 to S32, S50 and S51 in FIG. 5. As another embodiment, by determining only one or two of (1) to (3) above, implementation of wide-area wireless communication in the vehicle 1 may be restricted. The restriction of implementation of wide-area wireless communication in the vehicle 1 may not be performed.

Although, in the aforementioned embodiment, by the wide-area wireless communication control unit 26, the restriction of implementation of wide-area wireless communication in the vehicle 1 is cancelled when the wide-area wireless communication start information transmitted from the user terminal 100 is received through BLE communication and when the power supply 90 in the vehicle 1 is shifted from the OFF state to the ON state in step S34 and S52 in FIG. 5, the restriction of implementation of wide-area wireless communication in the vehicle 1 may be cancelled under another condition.

7. Different Embodiment

Figure 7:
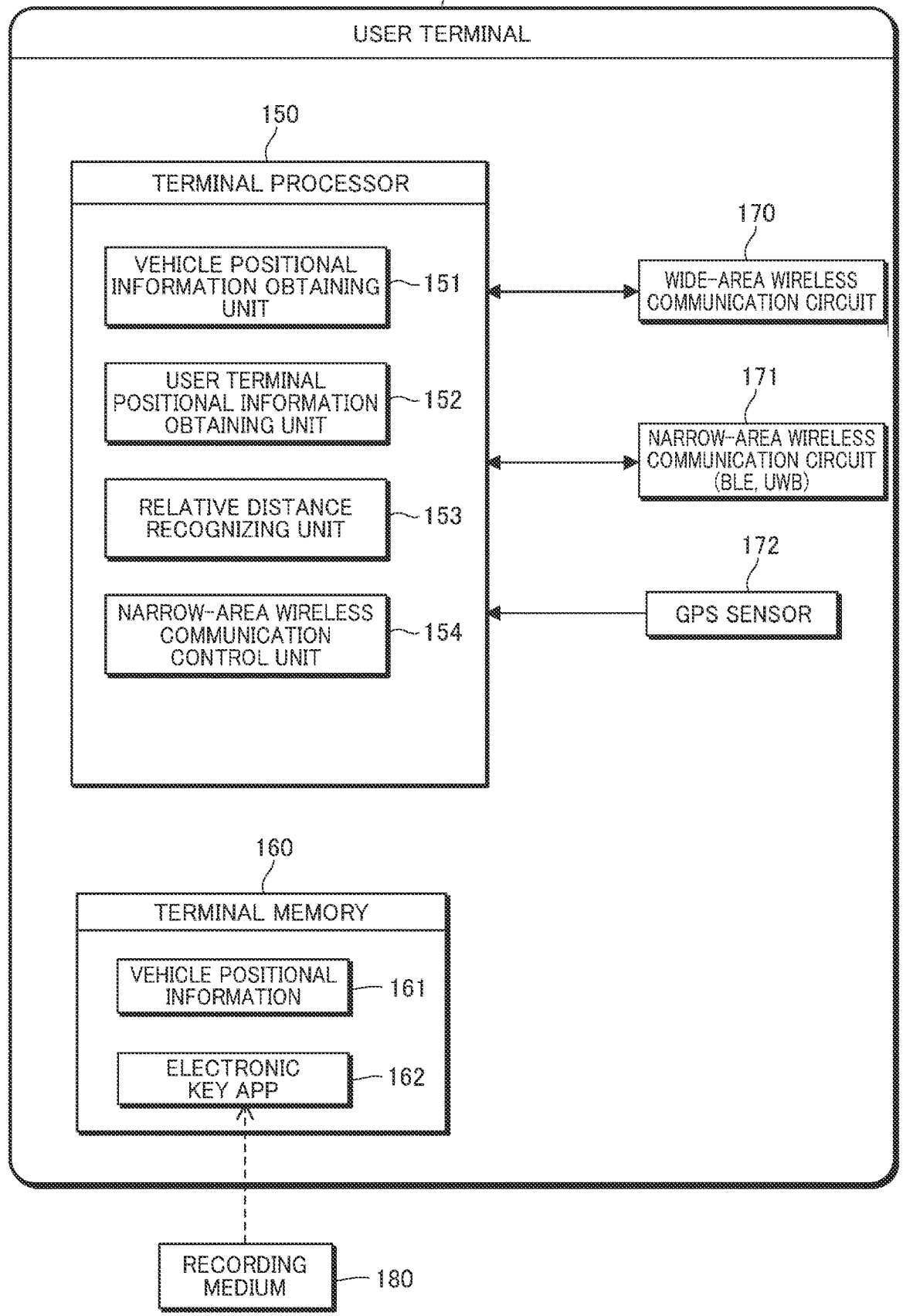
FIG. 7 is a configuration diagram of a user terminal.
Figure 8:
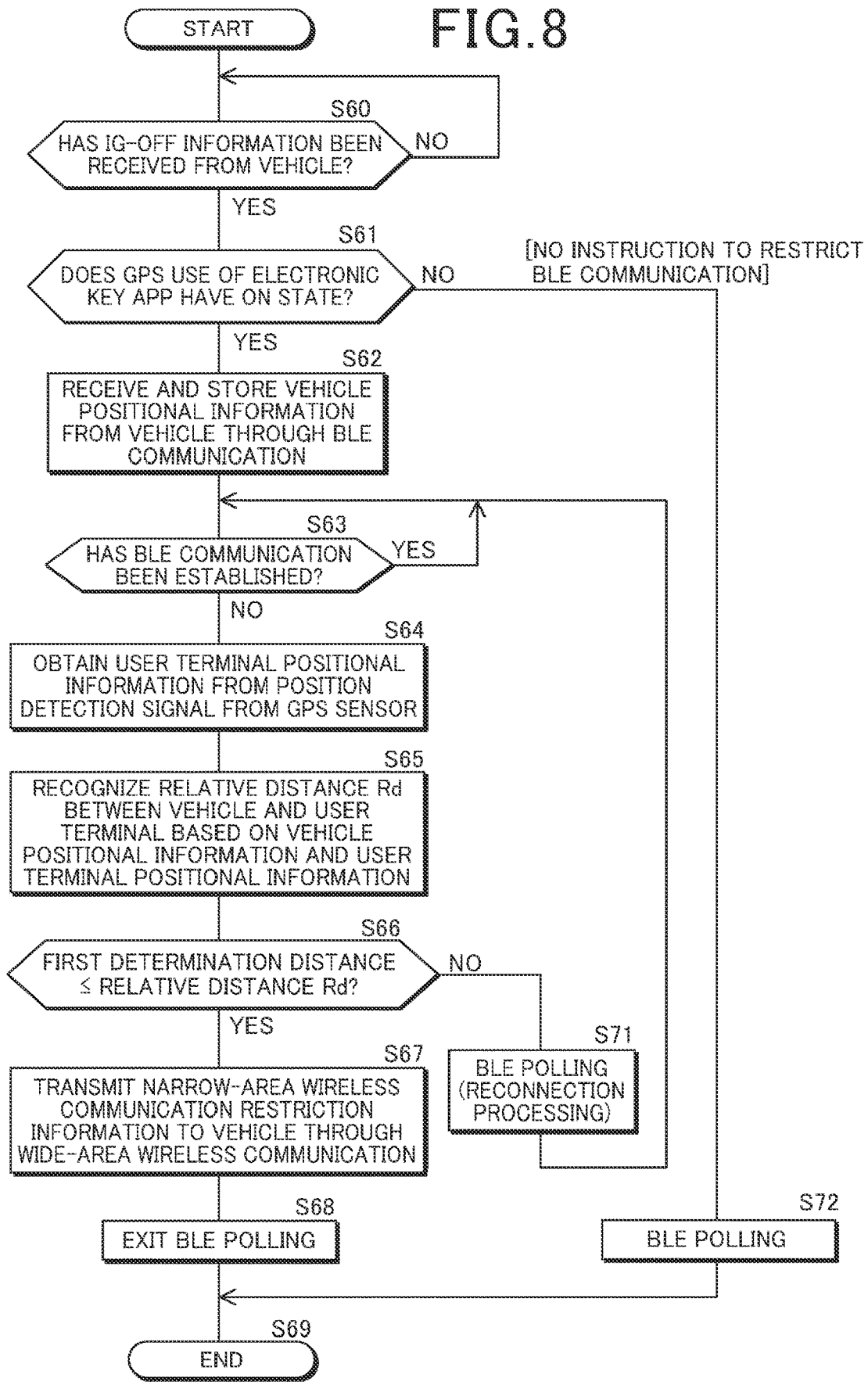
FIG. 8 is a flowchart of processing in the vehicle on a user terminal for restricting implementation of narrow-area wireless communication.

With reference to FIG. 7 to FIG. 9, a different embodiment in which the restriction of implementation of narrow-area wireless communication (BLE communication here) and the cancellation of the restriction in the vehicle 1 are performed by processing in the user terminal 100 is described.

According to the different embodiment, as shown in FIG. 7, the user terminal 100 includes a vehicle positional information obtaining unit 151, a user terminal positional information obtaining unit 152, a relative distance recognizing unit 153 and a narrow-area wireless communication control unit 154 as constituent elements corresponding to the vehicle positional information obtaining unit 21, the user terminal positional information obtaining unit 22, the relative distance recognizing unit 23 and the narrow-area wireless communication control unit 25, respectively, shown in FIG. 3. In this case, the vehicle control system of the present invention includes the constituent elements of the user terminal 100.

Referring to FIG. 7, the user terminal 100 includes a terminal processor 150, a terminal memory 160, a wide-area wireless communication circuit 170, a narrow-area wireless communication circuit 171 and a GPS sensor 172. The wide-area wireless communication circuit 170 performs wide-area wireless communication with the vehicle 1, and the narrow-area wireless communication circuit 131 performs BLE communication (corresponding to narrow-area wireless communication) with the vehicle 1. The GPS sensor 172 corresponds to a terminal position sensor of the present invention and detects a current position of the user terminal 100.

The terminal memory 160 stores a program 162 of the aforementioned electronic key app and vehicle positional information 161 transmitted from the vehicle 1. The terminal processor 150 includes one or more processors and functions as the vehicle positional information obtaining unit 151, the user terminal positional information obtaining unit 152, the relative distance recognizing unit 153 and the narrow-area wireless communication control unit 154 by reading and executing the program 162 of the electronic key app.

The program 162 of the electronic key app may be read from a recording medium 180 (such as an optical disk or a flash memory) storing the program 162 of the electronic key app to the user terminal 100 or may be downloaded from an external system such as the vehicle control server 200 to the user terminal 100.

The processing to be performed by the vehicle positional information obtaining unit 151 corresponds to a vehicle positional information obtaining step in the vehicle control method of the present invention, and the processing to be performed by the user terminal positional information obtaining unit 152 corresponds to a user terminal positional information obtaining step in the vehicle control method of the present invention. The processing to be performed by the relative distance recognizing unit 153 corresponds to a relative distance recognizing step in the vehicle control method of the present invention, and the processing to be performed by the narrow-area wireless communication control unit 154 corresponds to a narrow-area wireless communication control step in the vehicle control method of the present invention.

The vehicle positional information obtaining unit 151 receives and obtains, from the vehicle 1, vehicle positional information indicating a current position of the vehicle 1 detected by the GPS sensor 71 in the navigation device 70 in the vehicle 1 through wide-area wireless communication by the wide-area wireless communication circuit 170 or narrow-area wireless communication by the narrow-area wireless communication circuit 171. The vehicle positional information obtaining unit 151 stores the obtained vehicle positional information in the terminal memory 160. The user terminal positional information obtaining unit 152 obtains user terminal positional information indicating a current position of the user terminal 100 based on a detection signal of a current position of the user terminal 100 by the GPS sensor 172.

The relative distance recognizing unit 153 calculates a relative distance Rd (see FIG. 1) of the user terminal 100 with respect to the vehicle 1 based on the vehicle positional information obtained by the vehicle positional information obtaining unit 151 and the user terminal positional information obtained by the user terminal positional information obtaining unit 152. The narrow-area wireless communication control unit 154 transmits, to the vehicle 1 through wide-area wireless communication, narrow-area wireless communication control information that instructs to restrict implementation of narrow-area wireless communication in the vehicle 1 in accordance with the relative distance Rd.

Next, processing for restricting implementation of narrow-area wireless communication (BLE communication here) in the vehicle 1 by the user terminal 100 is described by following the flowchart shown in FIG. 8. The flowchart in FIG. 8 shows processing corresponding to a condition that, when BLE communication is established between the vehicle 1 and the user terminal 100, the user U gets off the vehicle 1 and moves away from the vehicle 1. If the narrow-area wireless communication control unit 154 receives ignition (IG)-OFF information indicating that a power-off operation has been performed on the vehicle 1 from the vehicle 1 through BLE communication in step S60 in FIG. 8, the narrow-area wireless communication control unit 154 moves the processing to step S61.

In step S61, the narrow-area wireless communication control unit 154 determines whether the GPS use of the electronic key app has an ON state or not. If the GPS use of the electronic key app has the ON state, the narrow-area wireless communication control unit 154 then moves the processing to step S62. On the other hand, if the GPS use of the electronic key app has an OFF state and recognition of a current position of the user terminal 100 is disabled, the narrow-area wireless communication control unit 154 moves the processing to step S72 where the polling processing of BLE is continued. In this case, the processing for restricting implementation of the BLE communication in the vehicle 1 is not performed by the user terminal 100.

In step S62, the vehicle positional information obtaining unit 151 receives vehicle positional information from the vehicle 1 through BLE communication and stores the vehicle positional information in the terminal memory 160. In the subsequent step S63, the narrow-area wireless communication control unit 154 determines whether BLE communication has been established between the user terminal 100 and the vehicle 1 or not and moves the processing to step S64 when the BLE communication is disconnected. In step S64, the user terminal positional information obtaining unit 152 obtains user terminal positional information from a position detection signal from the GPS sensor 172.

In step S65, the relative distance recognizing unit 153 calculates a relative distance Rd between the vehicle 1 and the user terminal 100 based on the vehicle positional information and the user terminal positional information. In the subsequent step S66, the narrow-area wireless communication control unit 154 determines whether the relative distance Rd is longer than or equal to the first determination distance or not. If the relative distance Rd is longer than or equal to the first determination distance, the narrow-area wireless communication control unit 154 moves the processing to step S67 where narrow-area wireless communication restriction information is transmitted to the vehicle 1 through the wide-area wireless communication.

In the vehicle 1 having received the narrow-area wireless communication restriction information, implementation of the narrow-area wireless communication is restricted by stopping the operation of the narrow-area wireless communication device 60, and power consumption by the wireless communication in the vehicle 1 is thus suppressed. It should be noted that, in the vehicle 1, the implementation of the narrow-area wireless communication in the vehicle 1 may be restricted by continuing the operation of the narrow-area wireless communication device 60 and increasing the polling period of BLE. In the subsequent step S68, the narrow-area wireless communication control unit 154 ends the polling processing by BLE, and power consumption by the wireless communication in the user terminal 100 is thus suppressed.

On the other hand, if the relative distance Rd is shorter than the first determination distance, the narrow-area wireless communication control unit 154 moves the processing from step S66 to step S71 where the polling processing by BLE is performed for recovering BLE communication with the vehicle 1 is performed and then moves the processing to step S63.

Next, processing in which the restriction of implementation of the narrow-area wireless communication (BLE communication here) in the vehicle 1 is cancelled by the user terminal 100 is described by following the flowchart shown in FIG. 9. The flowchart in FIG. 9 shows processing corresponding to a condition, when BLE communication is not performed between the vehicle 1 and the user terminal 100, the user U approaches the vehicle 1 for getting on the vehicle 1. In step S100 in FIG. 9, the narrow-area wireless communication control unit 154 determines whether the GPS use of the electronic key app has an ON state or not.

If the GPS use of the electronic key app has the ON state, the narrow-area wireless communication control unit 154 moves the processing to step S101. On the other hand, if the GPS use of the electronic key app has the OFF state and recognition of a current position of the user terminal 100 is disabled, the narrow-area wireless communication control unit 154 moves the processing to step S121 where polling processing by BLE is performed. In this case, since the implementation of BLE communication in the vehicle 1 is not restricted and the polling processing by BLE in the vehicle 1 is continuously performed because of the processing in step S61 and S72 in FIG. 8 described above, BLE communication between the vehicle 1 and the user terminal 100 is established when the user terminal 100 approaches the vehicle 1 up to the communicable distance by BLE.

In step S101, the vehicle positional information obtaining unit 151 determines whether vehicle positional information 121 is stored in the terminal memory 160 or not. If the vehicle positional information is stored in the terminal memory 160, the vehicle positional information obtaining unit 151 moves the processing to step S102 and, if the vehicle positional information is not stored in the terminal memory 160, moves the processing to step S120.

The vehicle positional information obtaining unit 151 receives and stores in the terminal memory 160 the vehicle positional information from the vehicle 1 through wide-area wireless communication in step S120 and moves the processing to step S102. In step S102, the user terminal positional information obtaining unit 152 obtains user terminal positional information indicating a current position of the user terminal 100 based on a position detection signal from the GPS sensor 172.

In the subsequent step S103, the relative distance recognizing unit 153 recognizes a relative distance Rd between the vehicle 1 and the user terminal 100 based on the vehicle positional information and the user terminal positional information. In the next step S104, the narrow-area wireless communication control unit 154 determines whether the relative distance Rd between the vehicle 1 and the user terminal 100 is shorter than the first determination distance or not.

If the relative distance Rd is shorter than the first determination distance, the narrow-area wireless communication control unit 154 moves the processing to step S105 and, if the relative distance Rd is longer than or equal to the first determination distance, moves the processing to step S102. In step S105, the narrow-area wireless communication control unit 154 transmits BLE start information that instructs to cancel the restriction of BLE communication to the vehicle 1 through wide-area wireless communication.

In the vehicle 1, the wide-area wireless communication device 50 and the vehicle control system 10 have a stand-by state where wide-area wireless communication is enabled after the operation for turning off the power supply is performed. Thus, the vehicle control system 10 activates the narrow-area wireless communication device 60 and cancels the restriction of the BLE communication in response to reception of the BLE start information transmitted from the user terminal 100 so that polling processing by BLE can be started.

The narrow-area wireless communication control unit 154 performs BLE polling in the subsequent step S106, and the narrow-area wireless communication control unit 154 determines whether BLE communication has been established between the vehicle 1 and the user terminal 100 in the next step S107. If the BLE communication has been established, the narrow-area wireless communication control unit 154 moves the processing to step S108 where the BLE polling is ended and, if the BLE communication has not been established, moves the processing to step S106 where the BLE polling is repeated.

It should be noted that a constituent element corresponding to the wide-area wireless communication control unit 26 shown in FIG. 3 may be provided in the user terminal 100, and the implementation of wide-area wireless communication in the vehicle 1 may be restricted by the user terminal 100.

It should be noted that FIG. 2, FIG. 6 and FIG. 7 are schematic diagrams showing the configurations of the vehicle control system 10, the vehicle control server 200 and the user terminal 100 by dividing them based on main processing details for easy understanding of the present invention of the subject application, but the configurations of the vehicle control system 10, the vehicle control server 200 and the user terminal 100 may be configured based on other divisions. Processing by the constituent elements may be executed by one hardware unit or may be executed by a plurality of hardware units. The processing by the constituent elements shown in FIGS. 4 and 5 and FIGS. 8 and 9 may be executed by one program or may be executed by a plurality of programs.

8. Configuration Supported by Embodiments Above

The embodiments above are specific examples of the following configuration.

(1) A vehicle control system that performs control over wireless communication in a vehicle having functionality of wide-area wireless communication through a public line and narrow-area wireless communication that performs narrow-area wireless communication for directly communicating with a mobile terminal, the vehicle control system including a vehicle positional information obtaining unit obtaining vehicle positional information indicating a current position of the vehicle, a user terminal positional information obtaining unit obtaining user terminal positional information indicating a current position of a user terminal, the user terminal having functionality of the wide-area wireless communication and the narrow-area wireless communication and being the mobile terminal to be used by a user of the vehicle, a relative distance recognizing unit recognizing a relative distance between the vehicle and the user terminal based on the vehicle positional information and the user terminal positional information, a wide-area wireless communication control unit controlling implementation of the wide-area wireless communication in the vehicle, and a narrow-area wireless communication control unit controlling implementation of the narrow-area wireless communication in the vehicle, and, if the relative distance is longer than or equal to a first determination distance set based on a communicable distance of the narrow-area wireless communication, restricting implementation of the narrow-area wireless communication in the vehicle.

According to the vehicle control system under (1), implementation of narrow-area wireless communication in a vehicle is restricted if the relative distance between the vehicle and the user terminal is longer than or equal to the first determination distance set based on the communicable distance of the narrow-area wireless communication. Thus, unnecessary power consumption by continuation of normal processing for performing the narrow-area wireless communication in the vehicle under a condition that the narrow-area wireless communication between the vehicle and the user terminal is disabled can be avoided, and the power consumption by the communication in the vehicle can be suppressed.

(2) The vehicle control system under (1), wherein the vehicle positional information obtaining unit, the user terminal positional information obtaining unit, the relative distance recognizing unit and the narrow-area wireless communication control unit are provided in the user terminal, the vehicle positional information obtaining unit obtains the vehicle positional information by receiving the vehicle positional information transmitted from the vehicle through the wide-area wireless communication or the narrow-area wireless communication, the user terminal positional information obtaining unit obtains the user terminal positional information based on a terminal position detection signal by a terminal position sensor provided in the user terminal, and the narrow-area wireless communication control unit restricts implementation of the narrow-area wireless communication in the vehicle by transmitting, to the vehicle through the wide-area wireless communication, narrow-area wireless communication restriction information that instructs to restrict the narrow-area wireless communication.

According to the vehicle control system under (2), the narrow-area wireless communication implemented between the vehicle and the user terminal is restricted by recognizing, by the user terminal, the relative distance between the vehicle and the user terminal. In this case, because the position of the vehicle does not change when the vehicle is stopped and wide-area wireless communication or narrow-area wireless communication is not required to be repeated between the user terminal and the vehicle for recognizing the position of the vehicle in the user terminal, the power consumption by the wireless communication in the vehicle can be suppressed.

(3) The vehicle control system under (2), wherein the vehicle positional information obtaining unit stores the vehicle positional information in a terminal memory provided in the user terminal, and the relative distance recognizing unit recognizes the relative distance based on the vehicle positional information stored in the terminal memory.

According to the vehicle control system under (3), by storing vehicle positional information indicating a position of the stopping vehicle in the terminal memory, subsequent reception of the vehicle positional information from the vehicle is not necessary. Thus, the power consumption in the vehicle by the wireless communication with the user terminal can be suppressed.

(4) The vehicle control system under (1), wherein the vehicle positional information obtaining unit, the user terminal positional information obtaining unit, the relative distance recognizing unit and the narrow-area wireless communication control unit are provided in the vehicle, the vehicle positional information obtaining unit obtains the vehicle positional information based on a vehicle position detection signal by a vehicle position sensor provided in the vehicle, and the user terminal positional information obtaining unit obtains the user terminal positional information by receiving the user terminal positional information transmitted from the user terminal through the wide-area wireless communication.

According to the vehicle control system under (4), when the distance between the vehicle and the user terminal is long and the narrow-area wireless communication between the vehicle and the user terminal is disabled, implementation of the narrow-area wireless communication in the vehicle can be restricted by the narrow-area wireless communication control unit provided in the vehicle by transmitting the user terminal positional information from the user terminal to the vehicle through the wide-area wireless communication.

(5) The vehicle control system under any one of (1) to (4), wherein the wide-area wireless communication control unit restricts implementation of the wide-area wireless communication in the vehicle when the relative distance has increased.

According to the vehicle control system under (5), when it is assumed that the user moves away from the vehicle and the possibility that the user uses the vehicle is decreased from the fact that the relative distance between the vehicle and the user terminal has increased, the implementation of the wide-area wireless communication in the vehicle is restricted, and the power consumption by the communication in the vehicle can be suppressed.

(6) The vehicle control system under any one of (1) to (5), wherein the wide-area wireless communication control unit restricts implementation of the wide-area wireless communication in the vehicle when the narrow-area wireless communication has been established between the vehicle and the user terminal.

According to the vehicle control system under (6), when the narrow-area wireless communication between the vehicle and the user terminal has been established and reception and transmission of information by the narrow-area wireless communication is enabled between the vehicle and the user terminal, power consumption by the communication in the vehicle can be suppressed by restricting implementation of the wide-area wireless communication in the vehicle.

(7) The vehicle control system under any one of (1) to (6), wherein the wide-area wireless communication control unit restricts implementation of the wide-area wireless communication in the vehicle if the relative distance is equal to or shorter than a second determination distance set based on the communicable distance of the narrow-area wireless communication.

According to the vehicle control system under (7), when the relative distance between the vehicle and the user terminal is equal to or shorter than the second determination distance and reception and transmission of information by the narrow-area wireless communication between the vehicle and the user terminal is enabled, power consumption by the communication in the vehicle can be suppressed by restricting implementation of the wide-area wireless communication in the vehicle.

(8) The vehicle control system under any one of (5) to (7), wherein under conditions that the narrow-area wireless communication has been established between the vehicle and the user terminal and implementation of the wide-area wireless communication in the vehicle is under restriction, when the vehicle receives wide-area wireless communication start information that instructs to start the wide-area wireless communication from the user terminal through the narrow-area wireless communication, the wide-area wireless communication control unit cancels the restriction of implementation of the wide-area wireless communication in the vehicle.

According to the vehicle control system under (8), when the narrow-area wireless communication has been established between the vehicle and the user terminal, the restriction of the implementation of the wide-area wireless communication in the vehicle can be cancelled by transmitting the wide-area wireless communication start information from the user terminal to the vehicle through the narrow-area wireless communication.

(9) The vehicle control system under any one of (5) to (8), further including a power supply state recognizing unit recognizing a state of a power supply for the vehicle, wherein, under a condition that implementation of the wide-area wireless communication in the vehicle is under restriction, when the power supply state recognizing unit recognizes that the power supply has been shifted from an OFF state to an ON state, the wide-area wireless communication control unit cancels the restriction of implementation of the wide-area wireless communication in the vehicle.

According to the vehicle control system under (9), the restriction of the implementation of the wide-area wireless communication in the vehicle can be cancelled at a time when it is assumed that the power supply for the vehicle has been shifted from an OFF state to an ON state and use of the vehicle has been started.

(10) A vehicle control method to be executed by a computer for controlling wireless communication in a vehicle having functionality of wide-area wireless communication through a public line and narrow-area wireless communication that performs narrow-area wireless communication for directly communicating with a mobile terminal, the vehicle control method including a vehicle positional information obtaining step of obtaining vehicle positional information indicating a current position of the vehicle, a user terminal positional information obtaining step of obtaining user terminal positional information indicating a current position of a user terminal, the user terminal having functionality of the wide-area wireless communication and the narrow-area wireless communication and being the mobile terminal to be used by a user of the vehicle, a relative distance recognizing step of recognizing a relative distance between the vehicle and the user terminal based on the vehicle positional information and the user terminal positional information, and a narrow-area wireless communication control step of controlling implementation of the narrow-area wireless communication in the vehicle and, if the relative distance is longer than or equal to a determination distance set based on a communicable distance of the narrow-area wireless communication, restricting implementation of the narrow-area wireless communication in the vehicle.

By executing the vehicle control method under (10) by a computer, the same operational effects as those of the vehicle control system under (1) can be acquired.

(11) A vehicle control method to be executed by a terminal processor included in a user terminal for controlling wireless communication in a vehicle having functionality of wide-area wireless communication through a public line and narrow-area wireless communication that performs narrow-area wireless communication for directly communicating with a mobile terminal, the user terminal being the mobile terminal to be used by a user of the vehicle, the vehicle control method including a vehicle positional information obtaining step of obtaining vehicle positional information indicating a current position of the vehicle by receiving the vehicle positional information from the vehicle through the wide-area wireless communication or the narrow-area wireless communication, a user terminal positional information obtaining step of obtaining user terminal positional information indicating a current position of the user terminal based on a terminal position detection signal by a terminal position sensor provided in the user terminal, a relative distance recognizing step of recognizing a relative distance between the vehicle and the user terminal based on the vehicle positional information and the user terminal positional information, and a narrow-area wireless communication control step of controlling implementation of the narrow-area wireless communication in the vehicle, and, if the relative distance is longer than or equal to a determination distance set based on a communicable distance of the narrow-area wireless communication, restricting implementation of the narrow-area wireless communication in the vehicle by transmitting narrow-area wireless communication restriction information that instructs to restrict the narrow-area wireless communication to the vehicle.

By executing the vehicle control method under (11) by the terminal processor provided in the user terminal, the same operational effects as those of the vehicle control system under (2) can be acquired.

(12) A vehicle control server that performs wide-area wireless communication between a vehicle having communication functionality by the wide-area wireless communication through a public communication and narrow-area wireless communication that performs narrow-area wireless communication for directly communicating with a mobile terminal and a user terminal having communication functionality by the wide-area wireless communication and the narrow-area wireless communication, the user terminal being the mobile terminal to be used by a user of the vehicle, the vehicle control server including a vehicle positional information obtaining unit obtaining vehicle positional information indicating a current position of the vehicle from the vehicle through the wide-area wireless communication, a user terminal positional information obtaining unit obtaining user terminal positional information indicating a current position of the user terminal from the user terminal through the wide-area wireless communication, a relative distance recognizing unit recognizing a relative distance between the vehicle and the user terminal based on the vehicle positional information and the user terminal positional information, and a narrow-area wireless communication control unit controlling implementation of the narrow-area wireless communication in the vehicle and, if the relative distance is longer than or equal to a determination distance set based on a communicable distance of the narrow-area wireless communication, transmitting narrow-area wireless communication restriction information that instructs to restrict implementation of the narrow-area wireless communication in the vehicle to the vehicle through the wide-area wireless communication.

When the relative distance between the vehicle and the user terminal is grasped through the wide-area wireless communication between the vehicle and the user terminal and is longer than or equal to a determination distance set based on the communicable distance of the narrow-area wireless communication, the vehicle control server under (12) restricts implementation of the narrow-area wireless communication in the vehicle by transmitting the narrow-area wireless communication restriction information to the vehicle. Thus, unnecessary power consumption by continuation of normal processing for performing the narrow-area wireless communication in the vehicle under a condition that the narrow-area wireless communication between the vehicle and the user terminal is disabled can be avoided, and the power consumption by the communication in the vehicle can be suppressed.

(13) The vehicle control server under (12), further including a vehicle remote operating unit, when narrow-area wireless communication establishment information indicating that the narrow-area wireless communication has been established between the vehicle and the user terminal is received from the vehicle through the wide-area wireless communication, performing a subsequent remote operation on the vehicle by transmitting remote operation instruction information including instruction details of the remote operation and an instruction to transmit the instruction details to the vehicle to the user terminal through the wide-area wireless communication.

According to the vehicle control server under (13), when the narrow-area wireless communication has been established between the vehicle and the user terminal, a remote operation on the vehicle is instructed from the vehicle control server to the vehicle through the narrow-area wireless communication between the user terminal and the vehicle. Thus, implementation of the wide-area wireless communication in the vehicle for the remote operation can be restricted, and the power consumption by the communication in the vehicle can be suppressed.

(14) The vehicle control server under (12) or (13), further including a wide-area wireless communication control unit controlling implementation of the wide-area wireless communication in the vehicle and, when power supply ON information indicating that a power supply for the vehicle has been shifted from an OFF state to an ON state is received from the user terminal through the wide-area wireless communication, transmitting, to the user terminal through the wide-area wireless communication, narrow-area wireless communication restriction cancellation information including an instruction to cancel restriction of implementation of the wide-area wireless communication and an instruction to transmit the cancellation instruction to the vehicle.

According to the vehicle control server under (14), by grasping that the power supply for the vehicle has been shifted from an OFF state to an ON state and transmitting the narrow-area wireless communication restriction cancellation information to the vehicle, the restriction of the implementation of the wide-area wireless communication in the vehicle can be cancelled at a time when it is assumed that the power supply for the vehicle has been shifted to the ON state and use of the vehicle has been started.

(15) A vehicle control method to be executed by a vehicle control server that performs wide-area wireless communication between a vehicle having communication functionality by the wide-area wireless communication through a public communication and narrow-area wireless communication that performs narrow-area wireless communication for directly communicating with a mobile terminal and a user terminal having communication functionality by the wide-area wireless communication and the narrow-area wireless communication, the user terminal being the mobile terminal to be used by a user of the vehicle, the vehicle control method including a vehicle positional information obtaining step of obtaining vehicle positional information indicating a current position of the vehicle from the vehicle through the wide-area wireless communication, a user terminal positional information obtaining step of obtaining user terminal positional information indicating a current position of the user terminal from the user terminal through the wide-area wireless communication, a relative distance recognizing step of recognizing a relative distance between the vehicle and the user terminal based on the vehicle positional information and the user terminal positional information, and a narrow-area wireless communication control step of controlling implementation of the narrow-area wireless communication in the vehicle and, if the relative distance is longer than or equal to a determination distance set based on a communicable distance of the narrow-area wireless communication, transmitting narrow-area wireless communication restriction information that instructs to restrict implementation of the narrow-area wireless communication in the vehicle to the vehicle through the wide-area wireless communication.

By executing the vehicle control method under (15) by the vehicle control server, the same operational effects as those of the vehicle control server under (12) can be acquired.

REFERENCE SIGNS LIST

1: vehicle, 10: vehicle control system, 20: vehicle processor, 21: vehicle positional information obtaining unit, 22: user terminal positional information obtaining unit, 23: relative distance recognizing unit, 24: power supply state recognizing unit, 25: narrow-area wireless communication control unit, 26: wide-area wireless communication control unit, 27: vehicle information providing unit, 40: memory, 41: vehicle control program, 50: wide-area wireless communication device, 60: narrow-area wireless communication device, 70: navigation device, 100, 110: user terminal, 150: terminal processor, 151: vehicle positional information obtaining unit, 152: user terminal positional information obtaining unit, 153: relative distance recognizing unit, 154: narrow-area wireless communication control unit, 160: terminal memory, 162: electronic key app, 200: vehicle control server, 210: server processor, 211: vehicle positional information obtaining unit, 212: user terminal positional information obtaining unit, 213: relative distance recognizing unit, 214: narrow-area wireless communication control unit, 215: wide-area wireless communication control unit, 216: vehicle remote operating unit, 217: vehicle information managing unit, 230: memory, 231: vehicle control program

What is claimed is:

1. A vehicle control system that performs control over wireless communication in a vehicle having functionality of wide-area wireless communication through a public line and narrow-area wireless communication that performs narrow-area wireless communication for directly communicating with a mobile terminal, the vehicle control system comprising a processor that includes:
    a vehicle positional information obtaining unit obtaining vehicle positional information indicating a current position of the vehicle;
    a user terminal positional information obtaining unit obtaining user terminal positional information indicating a current position of a user terminal, the user terminal having functionality of the wide-area wireless communication and the narrow-area wireless communication and being the mobile terminal to be used by a user of the vehicle;
    a relative distance recognizing unit recognizing a relative distance between the vehicle and the user terminal based on the vehicle positional information and the user terminal positional information;
    a wide-area wireless communication control unit controlling implementation of the wide-area wireless communication in the vehicle; and
    a narrow-area wireless communication control unit controlling implementation of the narrow-area wireless communication in the vehicle and, if the relative distance is longer than or equal to a first determination distance set based on a communicable distance of the narrow-area wireless communication, restricting implementation of the narrow-area wireless communication in the vehicle,
    wherein
    the vehicle positional information obtaining unit, the user terminal positional information obtaining unit, the relative distance recognizing unit and the narrow-area wireless communication control unit are provided in the user terminal,
    the vehicle positional information obtaining unit obtains the vehicle positional information by receiving the vehicle positional information transmitted from the vehicle through the wide-area wireless communication or the narrow-area wireless communication,
    the user terminal positional information obtaining unit obtains the user terminal positional information based on a terminal position detection signal by a terminal position sensor provided in the user terminal, and
    the narrow-area wireless communication control unit restricts implementation of the narrow-area wireless communication in the vehicle by transmitting, to the vehicle through the wide-area wireless communication, narrow-area wireless communication restriction information that instructs to restrict the narrow-area wireless communication.

2. The vehicle control system according to claim 1, wherein
    the vehicle positional information obtaining unit stores the vehicle positional information in a terminal memory provided in the user terminal, and
    the relative distance recognizing unit recognizes the relative distance based on the vehicle positional information stored in the terminal memory.

3. A vehicle control system that performs control over wireless communication in a vehicle having functionality of wide-area wireless communication through a public line and narrow-area wireless communication that performs narrow-area wireless communication for directly communicating with a mobile terminal, the vehicle control system comprising a processor that includes:

a vehicle positional information obtaining unit obtaining vehicle positional information indicating a current position of the vehicle;

a user terminal positional information obtaining unit obtaining user terminal positional information indicating a current position of a user terminal, the user terminal having functionality of the wide-area wireless communication and the narrow-area wireless communication and being the mobile terminal to be used by a user of the vehicle;

a relative distance recognizing unit recognizing a relative distance between the vehicle and the user terminal based on the vehicle positional information and the user terminal positional information;

a wide-area wireless communication control unit controlling implementation of the wide-area wireless communication in the vehicle; and a narrow-area wireless communication control unit controlling implementation of the narrow-area wireless communication in the vehicle and, if the relative distance is longer than or equal to a first determination distance set based on a communicable distance of the narrow-area wireless communication, restricting implementation of the narrow-area wireless communication in the vehicle, wherein the wide-area wireless communication control unit restricts implementation of the wide-area wireless communication in the vehicle when the relative distance has increased.

4. The vehicle control system according to claim 3, wherein under conditions that the narrow-area wireless communication has been established between the vehicle and the user terminal and implementation of the wide-area wireless communication in the vehicle is under restriction, when the vehicle receives wide-area wireless communication start information that instructs to start the wide-area wireless communication from the user terminal through the narrow-area wireless communication, the wide-area wireless communication control unit cancels the restriction of implementation of the wide-area wireless communication in the vehicle.

5. The vehicle control system according to claim 3, wherein the processor further includes a power supply state recognizing unit recognizing a state of a power supply for the vehicle, wherein, under a condition that implementation of the wide-area wireless communication in the vehicle is under restriction, when the power supply state recognizing unit recognizes that the power supply has been shifted from an OFF state to an ON state, the wide-area wireless communication control unit cancels the restriction of implementation of the wide-area wireless communication in the vehicle.

6. A vehicle control system that performs control over wireless communication in a vehicle having functionality of wide-area wireless communication through a public line and narrow-area wireless communication that performs narrow-area wireless communication for directly communicating with a mobile terminal, the vehicle control system comprising a processor that includes:

a vehicle positional information obtaining unit obtaining vehicle positional information indicating a current position of the vehicle;

a user terminal positional information obtaining unit obtaining user terminal positional information indicating a current position of a user terminal, the user terminal having functionality of the wide-area wireless communication and the narrow-area wireless communication and being the mobile terminal to be used by a user of the vehicle;

a relative distance recognizing unit recognizing a relative distance between the vehicle and the user terminal based on the vehicle positional information and the user terminal positional information;

a wide-area wireless communication control unit controlling implementation of the wide-area wireless communication in the vehicle; and a narrow-area wireless communication control unit controlling implementation of the narrow-area wireless communication in the vehicle and, if the relative distance is longer than or equal to a first determination distance set based on a communicable distance of the narrow-area wireless communication, restricting implementation of the narrow-area wireless communication in the vehicle, wherein the wide-area wireless communication control unit restricts implementation of the wide-area wireless communication in the vehicle when the narrow-area wireless communication has been established between the vehicle and the user terminal.

7. A vehicle control system that performs control over wireless communication in a vehicle having functionality of wide-area wireless communication through a public line and narrow-area wireless communication that performs narrow-area wireless communication for directly communicating with a mobile terminal, the vehicle control system comprising a processor that includes:

a vehicle positional information obtaining unit obtaining vehicle positional information indicating a current position of the vehicle;

a user terminal positional information obtaining unit obtaining user terminal positional information indicating a current position of a user terminal, the user terminal having functionality of the wide-area wireless communication and the narrow-area wireless communication and being the mobile terminal to be used by a user of the vehicle;

a relative distance recognizing unit recognizing a relative distance between the vehicle and the user terminal based on the vehicle positional information and the user terminal positional information;

a wide-area wireless communication control unit controlling implementation of the wide-area wireless communication in the vehicle; and a narrow-area wireless communication control unit controlling implementation of the narrow-area wireless communication in the vehicle and, if the relative distance is longer than or equal to a first determination distance set based on a communicable distance of the narrow-area wireless communication, restricting implementation of the narrow-area wireless communication in the vehicle, wherein the wide-area wireless communication control unit restricts implementation of the wide-area wireless communication in the vehicle if the relative distance is equal to or shorter than a second determination distance set based on the communicable distance of the narrow-area wireless communication.

8. A vehicle control method to be executed by a terminal processor included in a user terminal for controlling wireless communication in a vehicle having functionality of wide-area wireless communication through a public line and narrow-area wireless communication that performs narrow-area wireless communication for directly communicating with a mobile terminal, the user terminal being the mobile terminal to be used by a user of the vehicle, the vehicle control method comprising:
 a vehicle positional information obtaining step of obtaining vehicle positional information indicating a current position of the vehicle by receiving the vehicle positional information from the vehicle through the wide-area wireless communication or the narrow-area wireless communication;
 a user terminal positional information obtaining step of obtaining user terminal positional information indicating a current position of the user terminal based on a terminal position detection signal by a terminal position sensor provided in the user terminal;
 a relative distance recognizing step of recognizing a relative distance between the vehicle and the user terminal based on the vehicle positional information and the user terminal positional information; and
 a narrow-area wireless communication control step of controlling implementation of the narrow-area wireless communication in the vehicle, and, if the relative distance is longer than or equal to a determination distance set based on a communicable distance of the narrow-area wireless communication, restricting implementation of the narrow-area wireless communication in the vehicle by transmitting narrow-area wireless communication restriction information that instructs to restrict the narrow-area wireless communication to the vehicle,
 wherein
 the vehicle positional information obtaining step obtains the vehicle positional information by receiving the vehicle positional information transmitted from the vehicle through the wide-area wireless communication or the narrow-area wireless communication,
 the user terminal positional information obtaining step obtains the user terminal positional information based on a terminal position detection signal by a terminal position sensor provided in the user terminal, and
 the narrow-area wireless communication control step restricts implementation of the narrow-area wireless communication in the vehicle by transmitting, to the vehicle through the wide-area wireless communication, narrow-area wireless communication restriction information that instructs to restrict the narrow-area wireless communication.

9. A vehicle control server that performs wide-area wireless communication between a vehicle having communication functionality by the wide-area wireless communication through a public communication and narrow-area wireless communication that performs narrow-area wireless communication for directly communicating with a mobile terminal and a user terminal having communication functionality by the wide-area wireless communication and the narrow-area wireless communication, the user terminal being the mobile terminal to be used by a user of the vehicle, the vehicle control server comprising a server processor that includes:
 a vehicle positional information obtaining unit obtaining vehicle positional information indicating a current position of the vehicle from the vehicle through the wide-area wireless communication;
 a user terminal positional information obtaining unit obtaining user terminal positional information indicating a current position of the user terminal from the user terminal through the wide-area wireless communication;
 a relative distance recognizing unit recognizing a relative distance between the vehicle and the user terminal based on the vehicle positional information and the user terminal positional information; and
 a narrow-area wireless communication control unit controlling implementation of the narrow-area wireless communication in the vehicle and, if the relative distance is longer than or equal to a determination distance set based on a communicable distance of the narrow-area wireless communication, transmitting narrow-area wireless communication restriction information that instructs to restrict implementation of the narrow-area wireless communication in the vehicle to the vehicle through the wide-area wireless communication.

10. The vehicle control server according to claim 9, wherein the server processor further includes a vehicle remote operating unit, when narrow-area wireless communication establishment information indicating that the narrow-area wireless communication has been established between the vehicle and the user terminal is received from the vehicle through the wide-area wireless communication, performing a subsequent remote operation on the vehicle by transmitting remote operation instruction information including instruction details of the remote operation and an instruction to transmit the instruction details to the vehicle to the user terminal through the wide-area wireless communication.

11. The vehicle control server according to claim 9, wherein the server processor further includes a wide-area wireless communication control unit controlling implementation of the wide-area wireless communication in the vehicle and, when power supply ON information indicating that a power supply for the vehicle has been shifted from an OFF state to an ON state is received from the user terminal through the wide-area wireless communication, transmitting, to the user terminal through the wide-area wireless communication, narrow-area wireless communication restriction cancellation information including an instruction to cancel restriction of implementation of the wide-area wireless communication and an instruction to transmit the cancellation instruction to the vehicle.

12. A vehicle control method to be executed by a vehicle control server that performs wide-area wireless communication between a vehicle having communication functionality by the wide-area wireless communication through a public communication and narrow-area wireless communication that performs narrow-area wireless communication for directly communicating with a mobile terminal and a user terminal having communication functionality by the wide-area wireless communication and the narrow-area wireless communication, the user terminal being the mobile terminal to be used by a user of the vehicle, the vehicle control method comprising:
 a vehicle positional information obtaining step of obtaining vehicle positional information indicating a current position of the vehicle from the vehicle through the wide-area wireless communication;
 a user terminal positional information obtaining step of obtaining user terminal positional information indicating a current position of the user terminal from the user terminal through the wide-area wireless communication;
a relative distance recognizing step of recognizing a relative distance between the vehicle and the user terminal based on the vehicle positional information and the user terminal positional information; and
a narrow-area wireless communication control step of controlling implementation of the narrow-area wireless communication in the vehicle and, if the relative distance is longer than or equal to a determination distance set based on a communicable distance of the narrow-area wireless communication, transmitting narrow-area wireless communication restriction information that instructs to restrict implementation of the narrow-area wireless communication in the vehicle to the vehicle through the wide-area wireless communication.

* * * * *